(12) United States Patent
Nakamura et al.

(10) Patent No.: US 8,274,474 B2
(45) Date of Patent: Sep. 25, 2012

(54) CHARACTER INPUT DEVICE, CHARACTER INPUT DEVICE CONTROL METHOD, AND INFORMATION STORAGE MEDIUM

(75) Inventors: Tadashi Nakamura, Kanagawa-Pref. (JP); Kojiro Umemura, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1086 days.

(21) Appl. No.: 11/719,872

(22) PCT Filed: Jul. 3, 2006

(86) PCT No.: PCT/JP2006/313208
§ 371 (c)(1),
(2), (4) Date: Jun. 18, 2007

(87) PCT Pub. No.: WO2007/007573
PCT Pub. Date: Jan. 18, 2007

(65) Prior Publication Data
US 2008/0062136 A1   Mar. 13, 2008

(30) Foreign Application Priority Data
Jul. 13, 2005   (JP) .................................. 2005-203915

(51) Int. Cl.
*G09G 5/00* (2006.01)
(52) U.S. Cl. .................... 345/156; 715/809; 715/810
(58) Field of Classification Search ........... 345/156–184
See application file for complete search history.

(56) References Cited

U.S. PATENT DOCUMENTS
2003/0112223 A1 *   6/2003   Kim ............................. 345/169

FOREIGN PATENT DOCUMENTS
| JP | 2004030442 A | 1/2004 |
| JP | 2004310543 A | 11/2004 |
| JP | 2005092521 A1 | 4/2005 |

OTHER PUBLICATIONS

International Search Report of International Application PCT/JP2006/313208.

* cited by examiner

*Primary Examiner* — Kevin M Nguyen
*Assistant Examiner* — Cory Almeida
(74) *Attorney, Agent, or Firm* — Matthew B. Dernier, Esq; Gibson & Dernier LLP

(57) ABSTRACT

To provide a character input device allowing a user to smoothly carry out a "character input operation which is carried out by initially selecting any character group from a plurality of character groups each corresponding to a plurality of characters, then selecting any character from among those corresponding to that group, and determining the selected character as an input character". The display control unit (140) causes display means to display a character input screen which contains character group correspondence images corresponding to the plurality of character groups, and an input candidate presentation image for presenting characters corresponding to the focused character group, in which the character group correspondence image corresponding to the focus character group is distinctively displayed, and the character specified as a currently selected input candidate among the characters set corresponding to the focused character group is distinctively displayed in the input candidate presentation image. The input character determination unit (138) determines the character specified as the currently selected input candidate as the input character according to an input character determination operation.

9 Claims, 16 Drawing Sheets

FIG.4

| CHARACTER GROUP ID | BELONGING CHARACTERS |
|---|---|
| A1 | . , ! ? @ " ' ~ : ; <br> ( ) < > [ ] { } 1 |
| A2 | A B C 2 a b c |
| A3 | D E F 3 d e f |
| A4 | G H I 4 g h i |
| A5 | J K L 5 j k l |
| A6 | M N O 6 m n o |
| A7 | P Q R S 7 p q r s |
| A8 | T U V 8 t u v |
| A9 | W X Y Z 9 w x y z |
| A10 | / - ~ = * × ÷ + # ¥ <br> $ ¢ £ § % & \ ˆ \| 0 |
| H1 | あ い う え お ぁ ぃ ぅ ぇ ぉ |
| H2 | か き く け こ が ぎ ぐ げ ご |
| H3 | さ し す せ そ ざ じ ず ぜ ぞ |
| H4 | た ち つ て と っ だ ぢ づ で ど |
| H5 | な に ぬ ね の |
| H6 | は ひ ふ へ ほ ば び ぶ べ ぼ <br> ぱ ぴ ぷ ぺ ぽ |
| H7 | ま み む め も |
| H8 | や ゆ よ ゃ ゅ ょ |
| H9 | ら り る れ ろ |
| H10 | 。 、 わ ん |

FIG.5

| KEY IMAGE ID | KEY IMAGE | DISPLAY POSITION | CHARACTER GROUP ID |
|---|---|---|---|
| 001 | SPACE KEY IMAGE | ... | — |
| 002 | ENTER KEY IMAGE | ... | — |
| 003 | CANCEL KEY IMAGE | ... | — |
| ... | ... | ... | ... |
| 010 | CHARACTER KEY IMAGE ".@1" | ... | A1 |
| 011 | CHARACTER KEY IMAGE "ABC2" | ... | A2 |
| 012 | CHARACTER KEY IMAGE "DEF2" | ... | A3 |
| 013 | CHARACTER KEY IMAGE "GHI4" | ... | A4 |
| 014 | CHARACTER KEY IMAGE "JKL5" | ... | A5 |
| 015 | CHARACTER KEY IMAGE "MNO6" | ... | A6 |
| 016 | CHARACTER KEY IMAGE "PQRS7" | ... | A7 |
| 017 | CHARACTER KEY IMAGE "TUV8" | ... | A8 |
| 018 | CHARACTER KEY IMAGE "WXYZ9" | ... | A9 |
| 019 | CAPITAL-SMALL CONVERSION KEY IMAGE | ... | — |
| 020 | CHARACTER KEY IMAGE "/=0" | ... | A10 |
| 021 | LINE-FEED KEY IMAGE | ... | — |

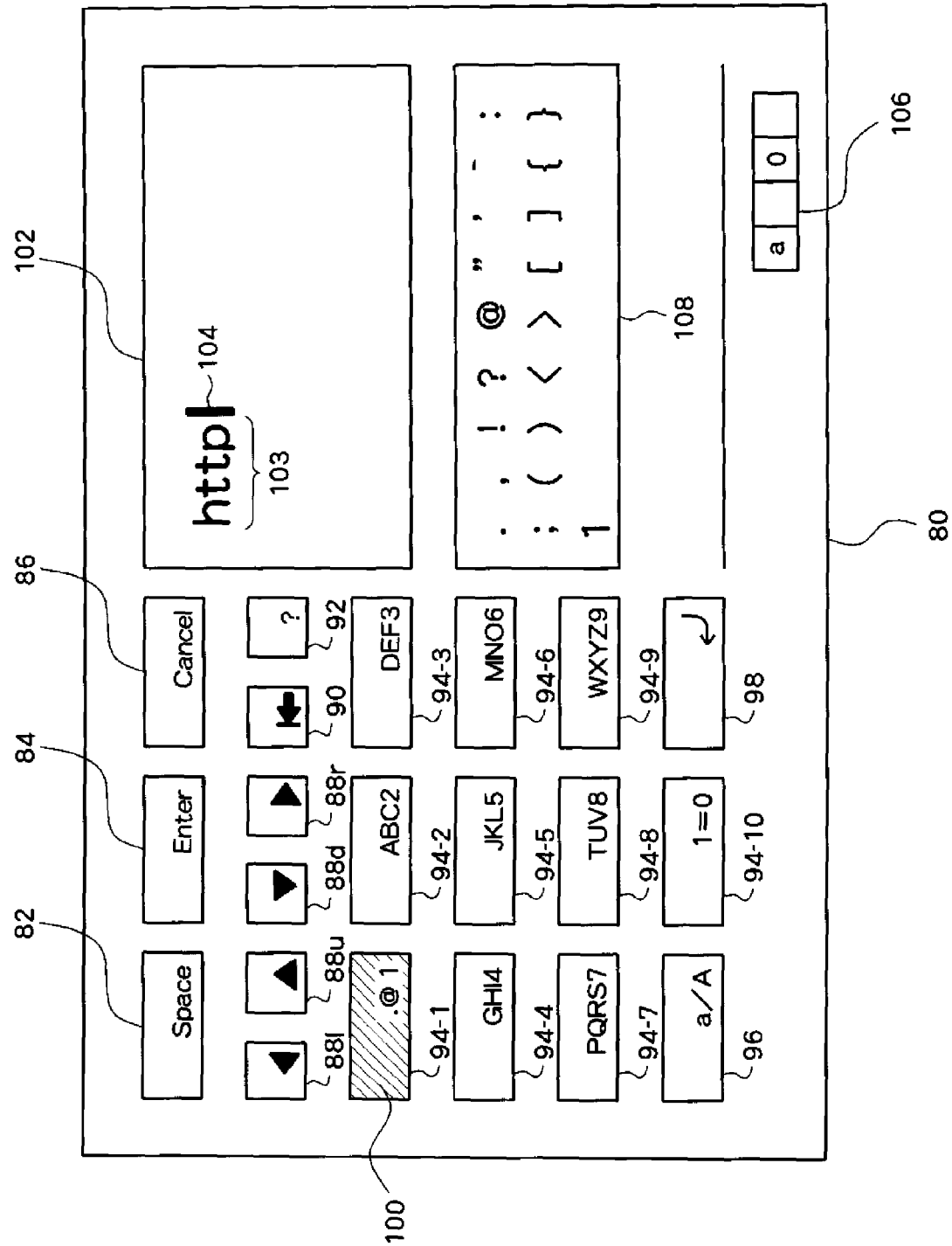

FIG.12

| PREDICTED CHARACTER STRING ID | PREDICTED CHARACTER STRING |
|---|---|
| S1 | brilliant |
| S2 | dream |
| S3 | good |
| S4 | http://xxx1.xx.xx |
| S5 | http://xxx2.xx.xx |
| S6 | HTTP(HyperText Transfer Protocol) |
| S7 | httpd |
| S8 | imagination |
| S9 | 奥の細道 |
| S10 | 松尾芭蕉 |
| S11 | 奥のぞみ |
| S12 | 奥のはたご |
| S13 | 清少納言 |
| S14 | 奥の居間 |
| S15 | あさの霧 |
| S16 | よるの霧 |
| S17 | いの一番 |
| S18 | たくさん |

FIG.14

| KEY IMAGE ID | KEY IMAGE | DISPLAY POSITION | CHARACTER GROUP ID |
|---|---|---|---|
| 101 | SPACE KEY IMAGE | ... | — |
| 102 | ENTER KEY IMAGE | ... | — |
| 103 | CANCEL KEY IMAGE | ... | — |
| ... | ... | ... | ... |
| 110 | CHARACTER KEY IMAGE "あ" | ... | H1 |
| 111 | CHARACTER KEY IMAGE "か" | ... | H2 |
| 112 | CHARACTER KEY IMAGE "さ" | ... | H3 |
| 113 | CHARACTER KEY IMAGE "た" | ... | H4 |
| 114 | CHARACTER KEY IMAGE "な" | ... | H5 |
| 115 | CHARACTER KEY IMAGE "は" | ... | H6 |
| 116 | CHARACTER KEY IMAGE "ま" | ... | H7 |
| 117 | CHARACTER KEY IMAGE "や" | ... | H8 |
| 118 | CHARACTER KEY IMAGE "ら" | ... | H9 |
| 119 | VOICED SOUND SYMBOL KEY IMAGE | ... | — |
| 120 | CHARACTER KEY IMAGE "わ" | ... | H10 |
| 121 | LINE-FEED KEY IMAGE | ... | — |

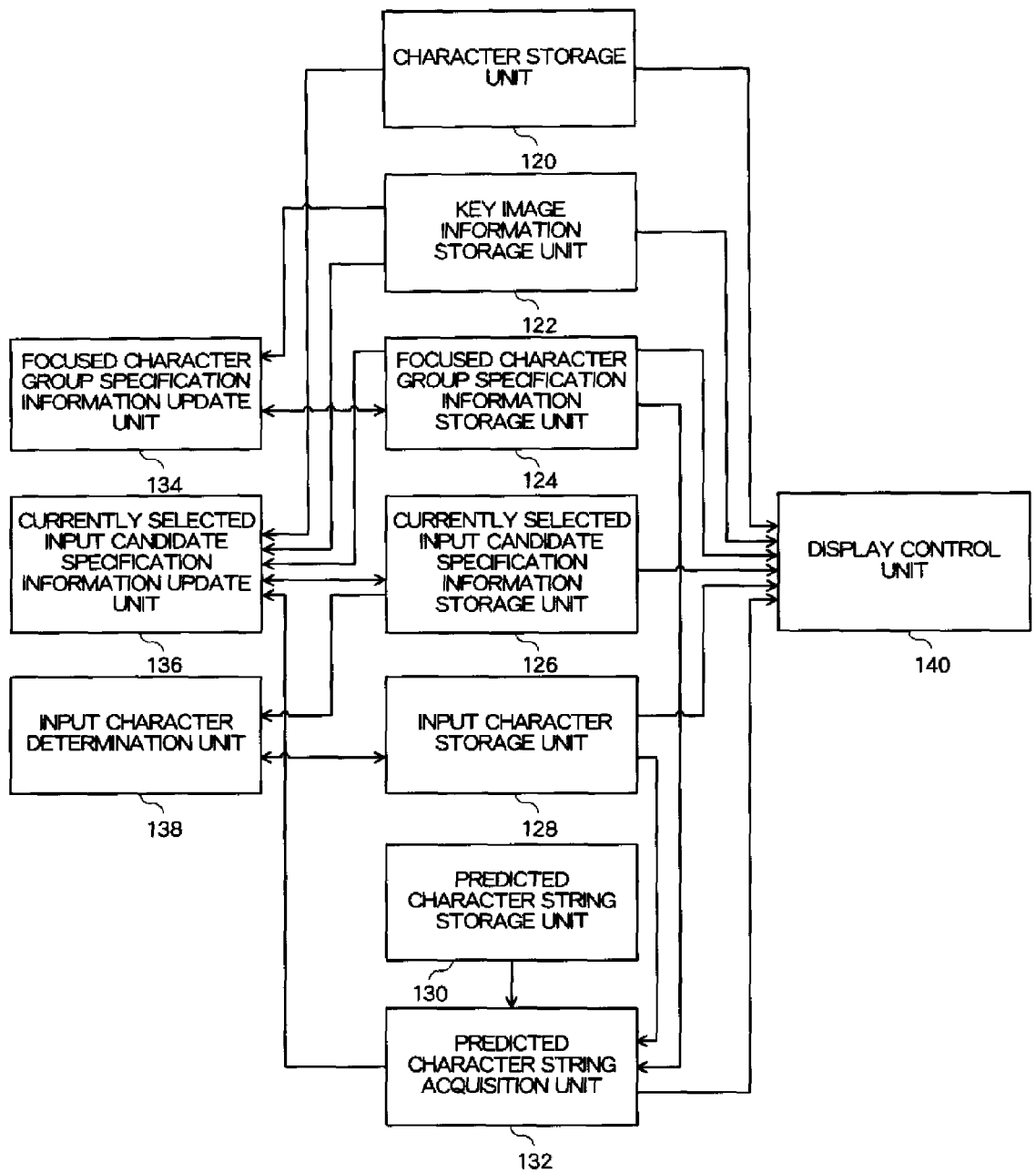

CHARACTER INPUT DEVICE, CHARACTER INPUT DEVICE CONTROL METHOD, AND INFORMATION STORAGE MEDIUM

TECHNICAL FIELD

The present invention relates to a character input device, a character input device control method, and an information storage medium.

BACKGROUND ART

There is known a character input device for inputting a character by initially selecting any group from among a plurality of character groups each corresponding to a plurality of characters, then selecting any character from among the characters corresponding to the selected character group, and determining the selected character as an input character.

According to the above-described character input device, a user wishing to input their desired character may not able to instantly recognize the character group to which their desired character set corresponds. This may hinder smooth input of the character.

The present invention has been conceived in view of the above, and an object thereof is to provide a character input device for allowing a user to smoothly input a character by initially selecting any group from among a plurality of character groups each corresponding to a plurality of characters, and then selecting any character from among the characters corresponding to the selected character group to thereby determine the selected character as an input character, a control method for the character input device, and an information storage medium.

DISCLOSURE OF THE INVENTION

In order to solve the above described problems, according to one aspect of the present invention, there is provided a character input device for determining an input character from among a plurality of characters, comprising: character storage means for storing the plurality of characters so as to each correspond to at least one of a plurality of character groups; focused character group specification information storage means for storing focused character group specification information for specifying any of the plurality of character groups as a focused character group; focused character group specification information update means for updating the focused character group specification information according to a focused point moving operation, such that the character group specified according to the focused character group specification information is updated to any other character group among the plurality of character groups; currently selected input candidate specification information storage means for storing currently selected input candidate specification information for specifying, as a currently selected input candidate, any of the characters stored corresponding to the character group specified according to the focused character group specification information; currently selected input candidate specification information update means for updating the currently selected input candidate specification information according to an input character selection operation which is different from the focused point moving operation, such that the character specified according to the currently selected input candidate specification information is updated to any other character among the characters stored corresponding to the character group specified according to the focused character group specification information; input character determination means for determining, according to an input character determination operation, the character specified according to the currently selected input candidate specification information as the input character; display control means for causing display means to display a character input screen containing character group correspondence images corresponding to the plurality of character groups and an input candidate presentation image for presenting characters stored corresponding to the character group specified according to the focused character group specification information, in which the character group correspondence image among the character group correspondence images, which corresponds to the character group specified according to the focused character group specification information, is distinctively displayed, and the character specified according to the currently selected input candidate specification information is distinctively displayed in the input candidate presentation image, wherein the display control means updates the character input screen displayed by the display means, when the focus character group specification information update means updates the focused character group specification information, such that the character group correspondence image corresponding to the character group specified according to the updated focused character group specification information is distinctively displayed, and updates the character input screen displayed by the display means, when the currently selected input candidate specification information update means updates the currently selected input candidate specification information, such that the character specified according to the updated currently selected input candidate specification information is distinctively displayed in the input candidate presentation image.

According to another aspect of the present invention, there is provided a control method for controlling a character input device for storing a plurality of characters so as to each correspond to at least one of a plurality of character groups and determining an input character from among the plurality of characters, comprising: a focused character group specification information update step of updating, according to a focused point moving operation, a content stored in a focused character group specification information storage means which stores focused character group specification information for specifying any of the plurality of character groups as a focused character group, such that the character group specified according to the focused character group specification information is updated to any other character group among the plurality of character groups; a currently selected input candidate specification information update step of updating, according to an input character selection operation which is different from the focused point moving operation, a content stored in a currently selected input candidate specification information storage means which stores currently selected input candidate specification information for specifying any of the characters stored corresponding to the character group specified according to the focused character group specification information as a currently selected input candidate, such that the character specified according to the currently selected input candidate specification information is updated to any other character among the characters stored corresponding to the character group specified according to the focused character group specification information; an input character determination step of determining, according to an input character determination operation, the character specified according to the currently selected input candidate specification information as the input character; a display control step of causing display means to display a character input screen containing character group correspondence images corresponding to the plurality of character groups and an input candidate presentation image for presenting characters stored corresponding to the character group specified according to the focused character group specification information, in which the character group correspondence image among the character group correspondence images, which corresponds to the character group specified according to the focused character group specification information, is distinctively displayed, and the character specified according to the currently selected input candidate specification information is distinctively displayed in the input candidate presentation image, wherein the display control step comprises a step of updating the character input screen displayed by the display means, when the focused character group specification information is updated at the focus character group specification information update step, such that the character group correspondence image corresponding to the character group specified according to the updated focused character group specification information is distinctively displayed, and a step of updating the character input screen displayed in the display means, when the currently selected input candidate specification information is updated at the currently selected input candidate specification information update step, such that the character specified according to the updated currently selected input candidate specification information is distinctively displayed in the input candidate presentation image.

According to another aspect of the present invention, there is provided a program for causing a computer, including a portable game device, a consumer game machine, a commercial game device, a portable phone, a portable digital assistant (PDA), a personal computer, and so forth to function as a character input device for determining an input character from among a plurality of characters, comprising: character storage means for storing the plurality of characters so as to each correspond to at least one of a plurality of character groups; focused character group specification information storage means for storing focused character group specification information for specifying any of the plurality of character groups as a focused character group; focused character group specification information update means for updating the focused character group specification information according to a focused point moving operation, such that the character group specified according to the focused character group specification information is updated to any other character group among the plurality of character groups; currently selected input candidate specification information storage means for storing currently selected input candidate specification information for specifying, as a currently selected input candidate, any of the characters stored corresponding to the character group specified according to the focused character group specification information; currently selected input candidate specification information update means for updating the currently selected input candidate specification information according to an input character selection operation which is different from the focused point moving operation, such that the character specified according to the currently selected input candidate specification information is updated to any other character among the characters stored corresponding to the character group specified according to the focused character group specification information; input character determination means for determining, according to an input character determination operation, the character specified according to the currently selected input candidate specification information as the input character; display control means for causing display means to display a character input screen containing character group correspondence images corresponding to the plurality of character groups and an input candidate presentation image for presenting characters stored corresponding to the character group specified according to the focused character group specification information, in which the character group correspondence image among the character group correspondence images, which corresponds to the character group specified according to the focused character group specification information is distinctively displayed, and the character specified according to the currently selected input candidate specification information is distinctively displayed in the input candidate presentation image, wherein the display control means updates the character input screen displayed by the display means, when the focus character group specification information update means updates the focused character group specification information, such that the character group correspondence image corresponding to the character group specified according to the updated focused character group specification information is distinctively displayed, and updates the character input screen displayed by the display means, when the currently selected input candidate specification information update means updates the currently selected input candidate specification information, such that the character specified according to the updated currently selected input candidate specification information is distinctively displayed in the input candidate presentation image.

According to yet another aspect of the present invention, there is provided a computer readable information storage medium storing the above-described program.

The present invention relates to a character input device for determining an input character from among a plurality of characters. In the present invention, the plurality of characters may be stored each corresponding to at least one of the plurality of character groups. In addition, focused character group specification information for specifying any of the plurality of character groups as a focused character group may be stored. The focused character group specification information may be updated according to a focused point moving operation, such that the character group specified according to the focused character group specification information is updated to any other character group among the plurality of character groups.

Further, in the present invention, currently selected input candidate specification information for specifying, as a currently selected input candidate, any of the characters stored corresponding to the character group specified according to the focused character group specification information may be stored. The currently selected input candidate specification information may be updated according to an input character selection operation which is different from the focused point moving operation, such that the character specified according to the currently selected input candidate specification information is updated to any other character among the characters stored corresponding to the character group specified according to the focused character group specification information. Also, the character specified according to the currently selected input candidate specification information may be determined as an input character according to an input character determination operation.

In the present invention, "a character input screen containing character group correspondence images corresponding to the plurality of character groups and an input candidate presentation image for presenting characters stored corresponding to the character group specified according to the focused character group specification information, in which the character group correspondence image among the character group correspondence images, which corresponds to the character group specified by the focused character group specification information, is distinctively displayed, and the character specified according to the currently selected input candidate specification information is distinctively displayed in the input candidate presentation image" may be displayed by a display means.

The character input screen may be updated, when the focused character group specification information is updated, such that the character group correspondence image corresponding to the character group specified according to the updated focused character group specification information is distinctively displayed. Also, the character input screen may be updated, when the currently selected input candidate specification information is updated, such that the character specified by the updated currently selected input candidate specification information is distinctively displayed in the input candidate presentation image.

In the present invention, it is possible to arrange so as to allow the user to smoothly carry out "a character input operation by initially selecting any group from among a plurality of character groups each corresponding to a plurality of characters, then selecting any character from among the characters corresponding to the selected character group, and determining the selected character as an input character".

It should be noted that the term "character", as is referred to in the specification, includes Chinese characters, hiragana, katakana, numbers, and so forth, and includes the characters adapted to languages other than Japanese, such as Alphabet, Cyrillic, Hangul, That, traditional Chinese, simplified Chinese, and so forth, as well as a symbol such as "("and")" and so forth, and a space and so forth.

In the above, the display control means may include means for obtaining a position, on the character input screen, of the character group correspondence image corresponding to the character group specified according to the focused character group specification information, and may determine a position at which to display the input candidate presentation image based on the obtained position.

In the above, the character input screen may contain a display area for displaying the character determined as the input character by the input character determination means, and the display control means may include means for obtaining a position within the display area, at which to display the determined character when any of the characters stored corresponding to the character group specified according to the focused character group specification information is determined as the input character by the input character determination means, and determine a position at which to display the input candidate presentation image based on the obtained position.

In the above, the character input device may further comprise input character storage means for storing the character determined as the input character by the input character determination means; predicted character string storage means for storing a plurality of predicted character strings; and predicted character string acquisition means for obtaining at least one of the predicted character strings stored in the predicted character string storage means, based on a content stored in the input character storage means and characters stored corresponding to the character group specified according to the focused character group specification information, wherein the currently selected input candidate specification information is information for specifying, as the currently selected input candidate, any character or predicted character string among the characters stored corresponding to the character group specified according to the focused character group specification information and the at least one predicted character string obtained by the predicted character string acquisition means, the currently selected input candidate specification information update means updates the currently selected input candidate specification information according to the input character selection operation, such that the character or the predicted character string specified according to the currently selected input candidate specification information is updated to any other character or predicted character string among the characters stored corresponding to the character group specified according to the focused character group specification information and the at least one predicted character string obtained by the predicted character string acquisition means, the input character determination means determines, when a predicted character string is specified as the currently selected input candidate according to the currently selected input candidate specification information, at least some of the characters contained in the predicted character string as the input character or characters, and the display control means causes the display means to display the character input screen containing the input candidate presentation image for presenting the at least one predicted character string obtained by the predicted character string acquisition means, together with the characters stored corresponding to the character group specified according to the focused character group specification information, in which the character or the predicted character string specified according to the currently selected input candidate specification information is distinctively displayed in the input candidate presentation image, and updates the character input screen displayed by the display means, when the currently selected input candidate specification information update means updates the currently selected input candidate specification information, such that the character or the predicted character string specified according to the updated currently selected input candidate specification information is distinctively displayed in the input candidate presentation image.

It should be noted that the term "character string" as is referred to in the specification is what is formed comprising one or more characters.

BRIEF DESCRIPTION OF DRAWINGS

FIG. 4 is a diagram showing one example of character group information;

FIG. 5 is a diagram showing one example of key image information on the alphabet input mode;

FIG. 6 is a diagram showing one example of the character input screen in the alphabet input mode;

FIG. 12 is a diagram showing one example of predicted character string data;

FIG. 14 is a diagram showing one example of key image information for the Chinese character hiragana input mode;

FIG. 15 is a functional block diagram of a portable electronic device used as the character input device according to this embodiment;

FIG. 16 is a diagram showing one example of a character string;

FIG. 17 is a diagram showing one example of furigana;

BEST MODE FOR CARRYING OUT THE INVENTION

In the following, one example of an embodiment of the present invention will be described in detail based on the accompanying drawings.

A character input device according to an embodiment of the present invention can be realized using a portable electronic device which functions, for example, as a portable game device, a portable music player, a portable digital assistant (PDA).

Figure 1:
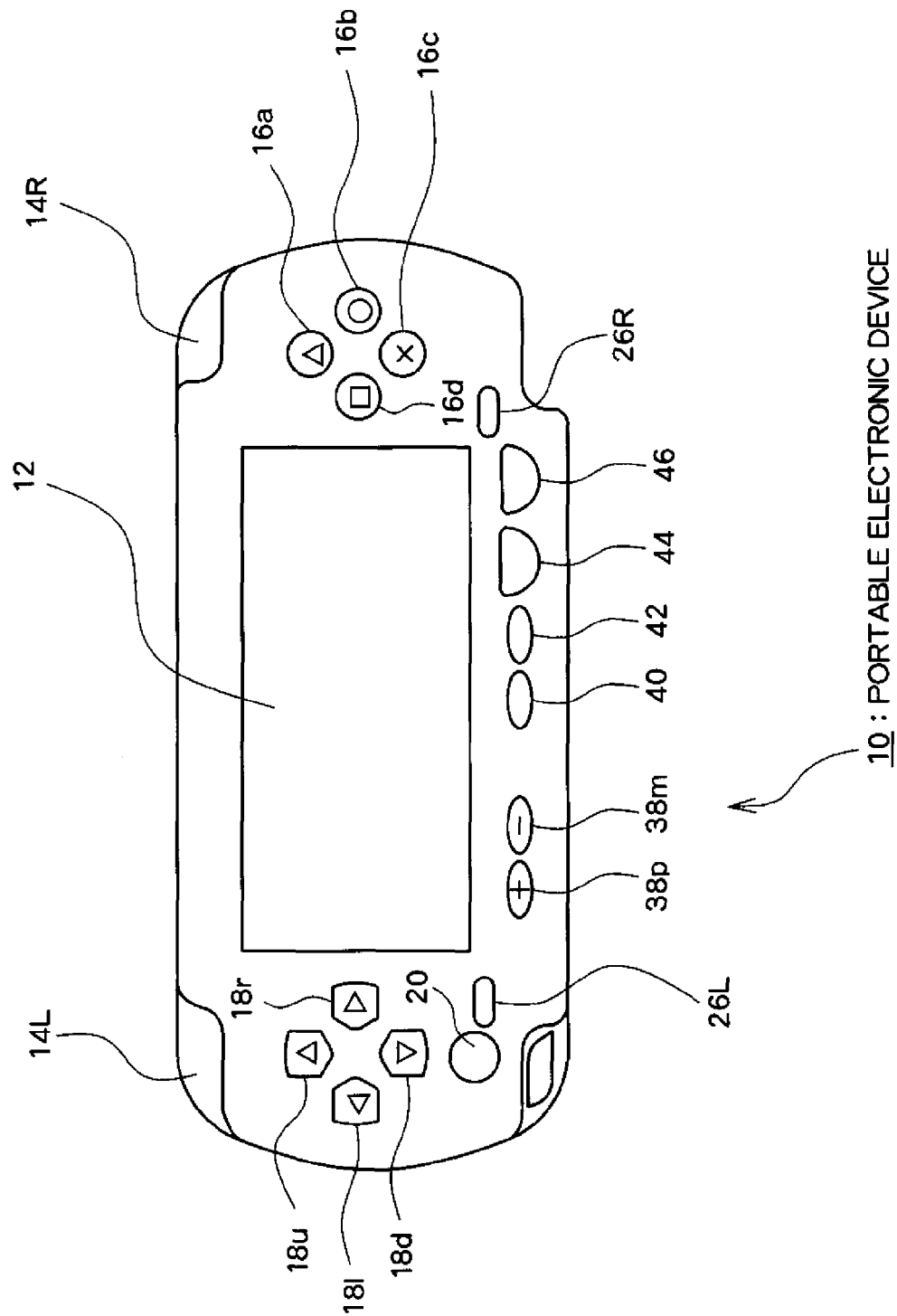
FIG. 1 is a diagram showing an external appearance of a portable electronic device used as a character input device according to this embodiment.

FIG. 1 is a diagram showing an external front appearance of a portable electronic device used as a character input device according to an embodiment of the present invention. The portable electronic device 10 shown in FIG. 1 has an enclosure having a thin box-like shape long in the lateral direction with the right and left ends thereof rounded like an arc, with a liquid crystal display 12 being mounted at the middle thereof.

Press buttons 16a, 16b, 16c, and 16d are provided on the right end of the liquid crystal display 12; direction keys 18u, 18r, 18d, and 18l are provided on the left end thereof. The user can operate the buttons 16a, 16b, 16c, and 16d and the direction keys 18u, 18r, 18d, and 18l using their thumbs while grasping the enclosure on both sides thereof using their two hands and looking at the liquid crystal display 12. Press buttons 14L and 14R are provided on the top left and right portions of the enclosure, respectively, to be operated by the user using their respective index fingers. In addition, a pad 20 is mounted on the lower side of the direction keys 18u, 18r, 18d, and 18l. The pad 20 can desirably slide in all directions parallel to the front surface of the enclosure, and operation data indicative of the sliding direction and amount can be input to the portable electronic device 10.

Speakers 26L and 26R are provided on the left and right sides of the liquid crystal display 12, respectively. This arrangement enables output of stereo sound.

Below the liquid crystal display 12, there are provided sound volume buttons 38m and 38p, a screen button 40, a sound button 42, a selection button 44, and a start button 46. The sound volume buttons 38m and 38p are buttons for adjusting the volume of the sound output via the speakers 26L and 26R. The screen button 40 is a button for adjusting the brightness of the liquid crystal display 12. Specifically, pressing the screen button 40 can cause the brightness of the liquid crystal display 12 to change from low, middle, to high. The sound button 42 is a button for turning the sound output from the speakers 26L and 26R on or off. The selection button 44 is a button for selecting an item in the menu shown in the liquid crystal display 12. The start button 46 is a button for starting a game mainly while a game program is executed by the portable electronic device 10.

Figure 2:
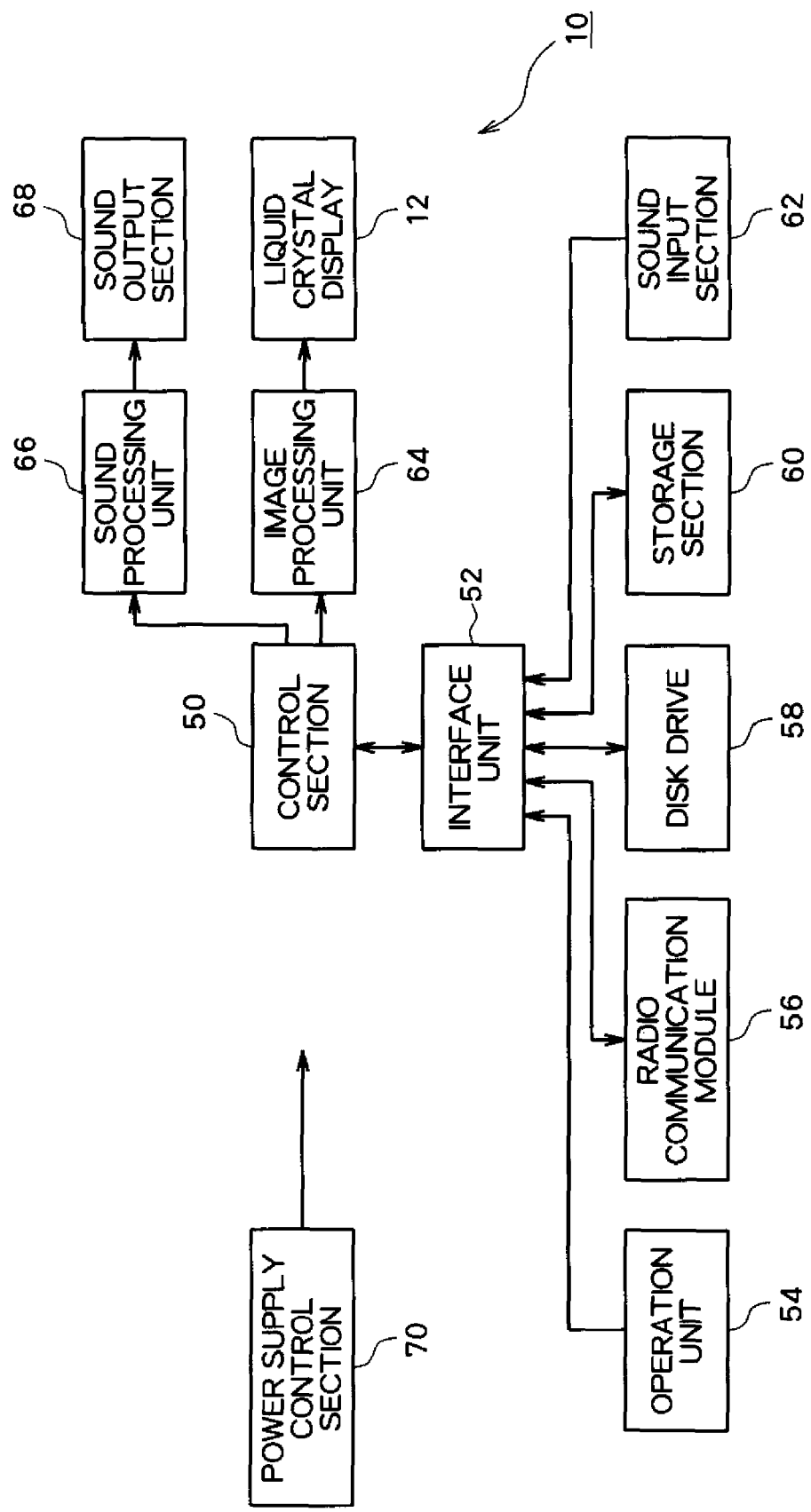
FIG. 2 is a diagram showing a hardware structure of the portable electronic device used as a character input device according to this embodiment.

FIG. 2 is a diagram showing a hardware structure of the portable electronic device 10. As shown in FIG. 2, the portable electronic device 10 comprises a control unit 50, an interface unit 52, an operation unit 54, a radio communication module 56, a disk drive 58, a storage unit 60, a sound input unit 62, an image processing unit 64, a liquid crystal display 12, a sound processing unit 66, a sound output unit 68, and a power supply control unit 70.

The operation unit 54, the radio communication module 56, the disk drive 58, the storage unit 60, and the sound input unit 62 are connected via the interface unit 52 to the control unit 50. The power supply control unit 70, the image processing unit 64, and the sound processing unit 66 are connected to the control unit 50. The liquid crystal display 12 is connected to the image processing unit 64. The sound output unit 68 is connected to the sound processing unit 66.

The control unit 50 is a MPU (Micro Processing Unit) or the like, and controls the respective sections of the portable electronic device 10 based on a program stored in an external storage medium set in the disk drive 58 or the storage unit 60.

The interface unit 52 outputs a signal sent from the control unit 50 to either one of the radio communication module 56, the disk drive 58, and the storage unit 60 according to an instruction input from the control unit 50. The interface unit 52 also outputs, while adjusting, signals from the operation unit 54, the radio communication module 56, the disk drive 58, the storage unit 60, and the sound input unit 62 to the control unit 50.

The operation unit 54 serves as an input means via which the user carries out various operations, and comprises operation members such as the buttons 14L, 14R, 16a, 16b, 16c, and 16d, the direction keys 18u, 18d, 18l, and 18r, the pad 20, the sound volume button 38, the screen button 40, the sound button 42, the selection button 44, the start button 46, and so forth. Operation data (an operational signal) describing the content of an operation carried out with respect to these operation members (for example, presence or absence of an operation, the amount of operation, the operational direction, and so forth) is supplied via the interface 52 to the control unit 50.

The radio communication module 56 is a radio communication device defined, for example, as 802.11b or g, or the like, and sends data to be transmitted (transmission object data) by means of radio according to an instruction input from the control unit 50. Also, the radio communication module 56 receives a signal arriving at an antenna (not shown) and outputs to the control unit 50.

In response to an instruction input from the control unit 50, the disk drive 58 reads data from an external storage medium which is set, and outputs to the control unit 50. The storage unit 60 is a storage element such as a RAM (Random Access Memory), a ROM (Read Only Memory), and so forth, and holds a program to be executed by the control unit 50. The storage unit 60 also functions as a work memory for the control unit 50.

The image processing unit 64 comprises a VRAM (Video Random Access Memory). According to an instruction input from the control unit 50, the image processing unit 64 renders into the VRAM the image of a screen to be displayed in the liquid crystal display 12. The image processing unit 64 outputs a video signal for use to display the image of the screen, rendered in the VRAM, to the liquid crystal display 12. The liquid crystal display 12 controls the liquid crystal based on the video signal input from the image processing unit 64, and displays the video (image).

According to an instruction input from the control unit 50, the sound processing unit 66 combines sounds, and outputs a signal of the combined sound to the sound output unit 68. It should be noted that a "sound" as is referred to here refers to a variety of sounds such as, for example, a beep sound, an instrumental sound, human voice, and so forth. The sound output unit 68 is, for example, speakers 26L and 26R, a headphone terminal, and so forth, and drives the speakers 26L and 26R based on the sound signal input from the sound processing unit 66, or outputs the sound signal to the headphone terminal.

The sound input unit 62 may be a microphone, for example, and converts ambient sound into a sound signal in the form of an electric signal for output. Also, the power supply control unit 70 supplies power to the respective sections.

In this embodiment, a program for causing the portable electronic device 10 to function as a character input device is stored in the storage unit 60, and executed by the control unit 50. The above-described program is stored in the storage unit 60 at the time of being shipped from the factory. Alternatively, the above-described program may be provided via a communication network and then stored via the radio communication module 56 into the storage unit 60. Still alternatively, the above-described program may be stored in an external storage medium and then read via the disk drive 58 and stored in the storage unit 60.

In the following, a technique employed by the portable electronic device 10 having the above-described structure to allow a user to smoothly input a character using the operation unit 54 will be described.

Initially, a character input screen shown in the liquid crystal display 12 will be described.

For the character input screen, various input modes are available including an alphabet input mode for inputting alphabets, symbols, and/or numbers, a Chinese character hiragana input mode for inputting Chinese characters and/or hiragana, a katakana input mode for inputting katakana, and so forth. These input modes are switched from one to another in response to the selection button 44 being pressed. In the following, the alphabet input mode and the Chinese character hiragana input mode will be mainly described.

[Alphabet Input Mode]

Initially, the alphabet input mode will be described.

Figure 3:
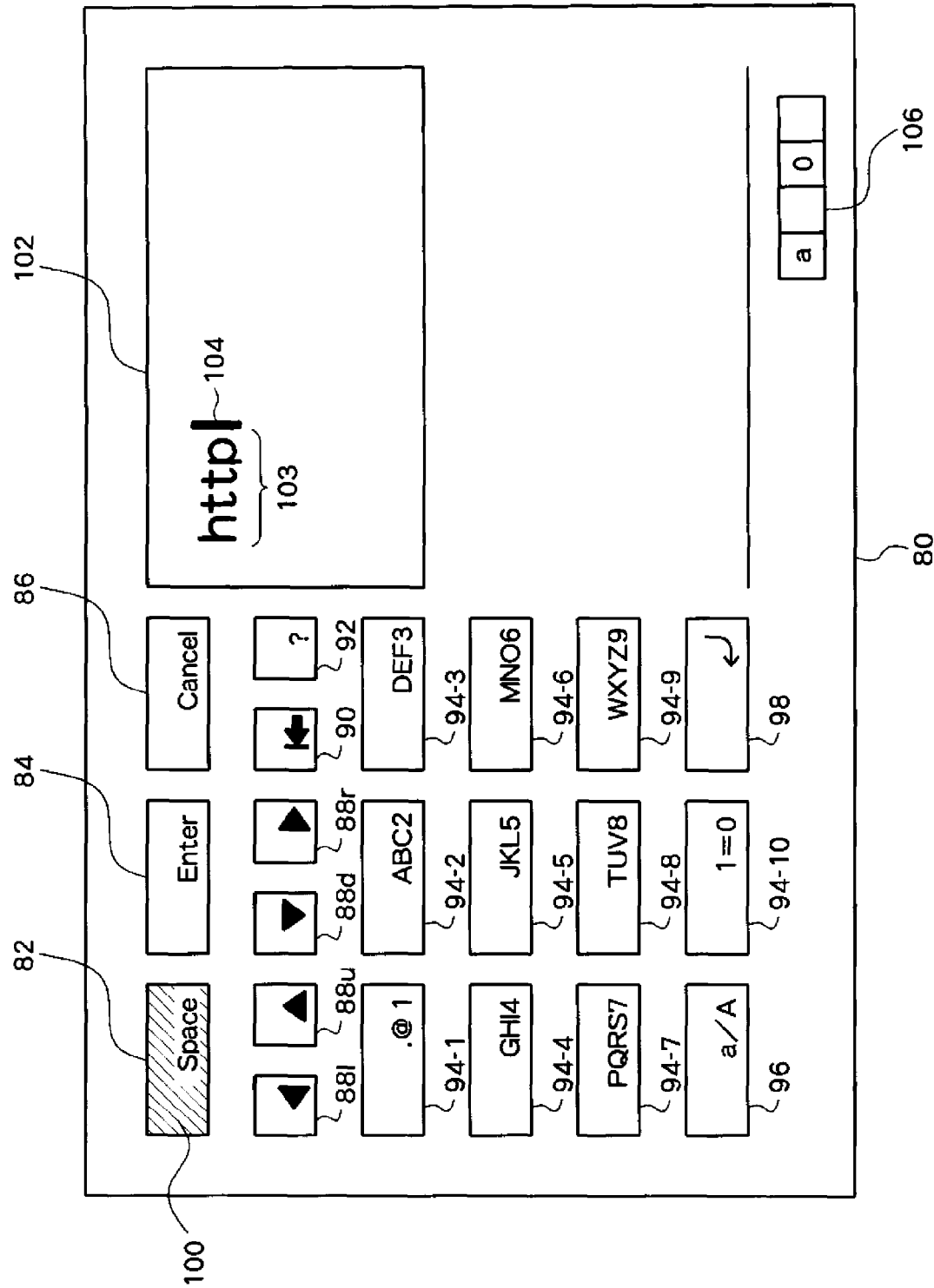
FIG. 3 is a diagram showing one example of a character input screen.

FIG. 3 shows one example of the character input screen for the alphabet input mode. As shown in FIG. 3, the character input screen 80 contains a space key image 82, a enter key image 84, a cancel key image 86, direction key images 88*l*, 88*u*, 88*d*, and 88*r*, a delete key image 90, a help key image 92, character key images 94-1 through 94-10, a capital-small conversion key image 96, a line feed key image 98, an input state presentation form 102, and an input mode indication image 106, respectively defined therein.

In the input state presentation form 102, an input character string 103 comprising the characters already input by the user appears from the left to the right. Also, in the input state presentation form 102, a cursor 104 appears indicating a position (an addition position) in which a character to be next input is to be added. The input mode indication image 106 indicates the currently selected input mode.

The key images are used to allow the user to input various instructions in connection with a character input operation. Specifically, the space key image 82 is used to instruct input of a space character. The enter key image 84 is used to instruct completion of the character input operation. The cancel key image 86 is used to instruct cancel of the character input operation. The direction key images 88*l*, 88*u*, 88*d*, and 88*r* are used to instruct movement of the cursor 104. The delete key image 90 is used to instruct deletion of the character preceding by one the cursor 104. The help key image 92 is used to instruct display of a help screen. The character key images 94-1 through 94-10 are used to instruct input of a character. The capital-small conversion key image 96 is used to instruct conversion to a capital or small letter. The line feed key image 98 is used to instruct line-feeding.

On the character input screen 80, a key focus 100 is shown on any of the key images, indicating that the concerned key image is in the selected state. In the example shown in FIG. 3, the key focus 100 is formed on the space key image 82, whereby the space key image 82 is distinctively displayed.

In response to any of the direction keys 18*u*, 18*d*, 18*l*, and 18*r* pressed by the user, the key focus 100 moves in the direction corresponding to the content of the pressing. For example, when the direction key 18*r* is pressed with the character input screen 80 as shown in FIG. 3 shown, the key focus 100 moves to the enter key image 84 on the right of the space key image 82. It should be noted that the key focus 100 may be arranged so as to move either in response to an operation carried out with respect to the pad 20, or the buttons 14L and 14R.

When the user presses the selection operation button for use in a selection operation (for example, the button 16*b* or 16*a*), the processing assigned to the key image which is then distinctively displayed by the key focus 100 is carried out. For example, when the selection operation button is pressed with the key focus 100 located on the space key image 82, a space character is input.

Each of the character key images 94-1 through 94-10 is set corresponding to a plurality of characters. For example, the portable electronic device 10 according to this embodiment holds character group information such as is shown in FIG. 4. This character group information comprises identification information of the respective character groups (a character group ID) and the characters belonging to the respective character groups, both set corresponding to each other, and defines grouping of characters. To each of the character groups, a plurality of characters are set corresponding in a predetermined order.

The portable electronic device 10 additionally holds key image information such as is shown in FIG. 5, for example. The key image information comprises the kinds of key images to be displayed on the character input screen 80 in the alphabet input mode and the positions in which the respective key images are displayed. In the key image information, a character group ID is set corresponding to each of the character key images without duplication. In the example shown in FIG. 5, the character group "A1" is set corresponding to the character key image ".@1" (the character key image 94-1); the character group "A2" is set corresponding to the character key image "ABC2" (the character key image 94-2). That is, a character group "An" is set corresponding to a character key image 94-*n*. Also, as shown in FIG. 3, in each of the character key images shown on the character input screen 80, at least some of the characters set corresponding to that character key image are shown.

In the following, an operation to be carried out by the user on the character input screen 80 will be described. Specifically, a case in which the user is going to input the character ":" (the character the user is going to input is hereinafter referred to as an input instruction object character) will be described here.

Initially, the user moves the key focus 100 to the character key image set corresponding to the input instruction object character ":". In this embodiment, it is arranged such that the characters (input candidates) set corresponding to each of the character key images are presented following the key focus 100 moving across the character key images. FIG. 6 shows the character input screen 80 with the key focus 100 having been moved to, and located on, the character key image 94-1. In this case, the input candidate presentation image 108 appears on the character input screen 80, as shown in FIG. 6. Specifically, in the input candidate presentation image 108, the characters corresponding to the character key image 94-1 are displayed in a predetermined order.

As the character key image shows at least some of the characters corresponding to that character key image, as described above, in the case where the input instruction object character is an alphabet or a number, for example, the user can know or guess the character key image to which the input instruction object character corresponds with reference to the shown characters.

However, in the case where the input instruction object character is a symbol like ":", for example, the user may not be able to know or guess the character key image to which the concerned symbol corresponds. In connection with this point, the input candidate presentation image 108 which presents the respective characters set corresponding to the character key image are shown following the key focus 100 moving across the character key images. With this arrangement, the user can readily find the character key image to which the input instruction object character corresponds.

Then, the user first moves the key focus 100 to the character key image 94-1 (the character key image to which the input instruction object character ":" corresponds), and then selects the input instruction object character ":" from among the respective characters set corresponding to the character key image 94-1.

Specifically, in this embodiment, the initial character "." among the characters set corresponding to the character key image 94-1 is brought into the selected state in response to the selection operation button (for example, the button 16b or 16a) pressed once by the user; the second character "," is brought into the selected state in response to the selection operation button pressed once more by user.

That is, every time the user presses the selection operation button, any of the characters set corresponding to the character key image 94-1 is sequentially brought into the selected state according to the predetermined order. In other words, the character corresponding to the number of times the selection operation button is pressed (the number of times the selection operation button is pressed after the key focus 100 is moved to the character key image 94-1) among those which are set corresponding to that character key image is brought into the selected state. It should be noted that pressing the selection operation button with the last character "1" in the selected state causes the initial character "." to be brought into the selected state.

Figure 7:
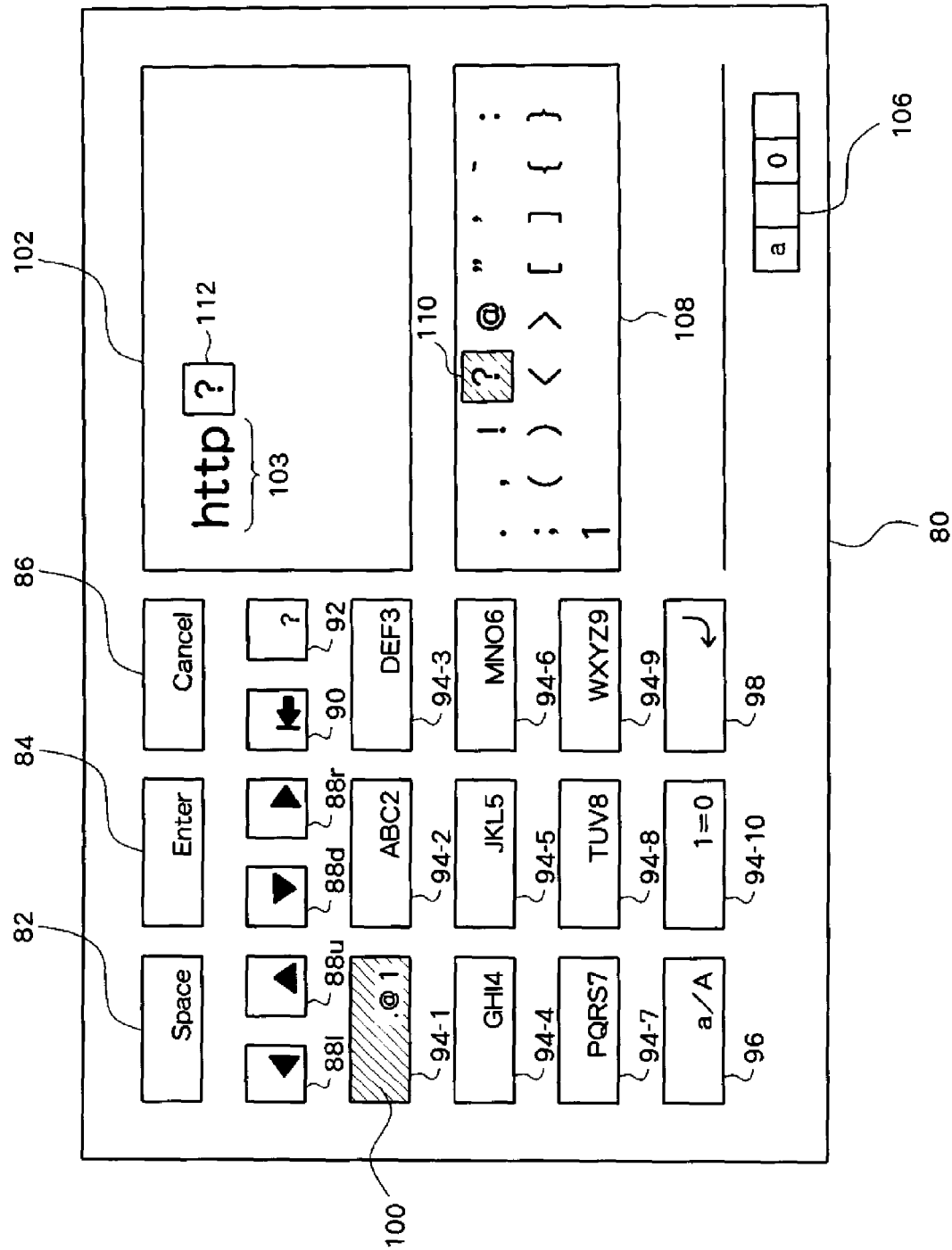
FIG. 7 is a diagram showing one example of the character input screen in the alphabet input mode.

FIG. 7 shows the character input screen 80 resulting when the selection operation button is pressed four times. As shown in FIG. 7, in the input state presentation form 102, a currently selected input candidate 112 indicating the currently selected character, or the character in the selected state, namely "?" here, is shown instead of the cursor 104. That is, the currently selected input candidate 112 is shown in the addition position of the character to be next input.

In addition, in the input candidate presentation image 108, an input candidate focus 110 is shown falling on any of the characters, indicating that the concerned character is in the selected state, whereby the character in the selected state is distinctively displayed. Specifically, in the example shown in FIG. 7, the character "?", which is in the selected state, is distinctively displayed. Every time the user presses the selection operation button, the currently selected input candidate 112 is updated, and the input candidate focus 110 moves to the subsequent character for distinctive display.

As described above, as the character in the selected state is distinctively displayed in the input candidate presentation image 108, the user can instantly know how many more times the selection operation button needs to be pressed in order to bring the desired character into the selected state. This helps the user smoothly input the character.

Figure 8:
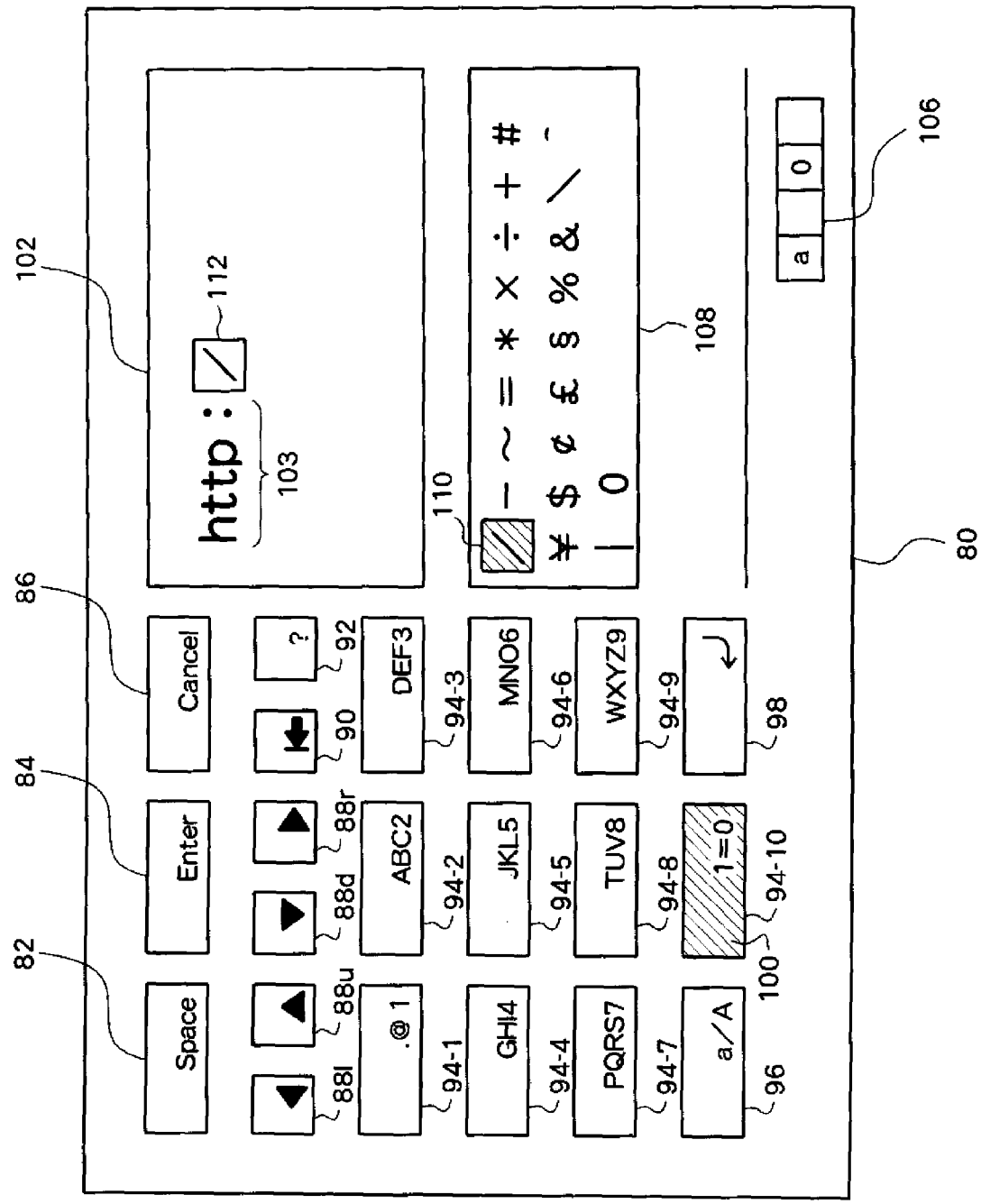
FIG. 8 is a diagram showing one example of the character input screen in the alphabet input mode.

After the user presses the selection operation button nine times to thereby bring the input instruction object character ":" into the selected state, and then moves the key focus 100 to another key image (for example, another character key image or a direction key image), the character ":" is determined as the input character by pressing the selection operation button. For example, when the user moves the key focus 100 to the character key image 94-10, intending to input the next desired character "/", and presses the selection operation button, the character input screen 80 is updated into that which is shown in FIG. 8. That is, the input character string 103 is updated into "the character string 'http:', formed by adding the character ":", newly determined as an input character, to the position indicated by the cursor 104 (or the currently selected input candidate 112), of the original input character string 'http'".

Figure 9:
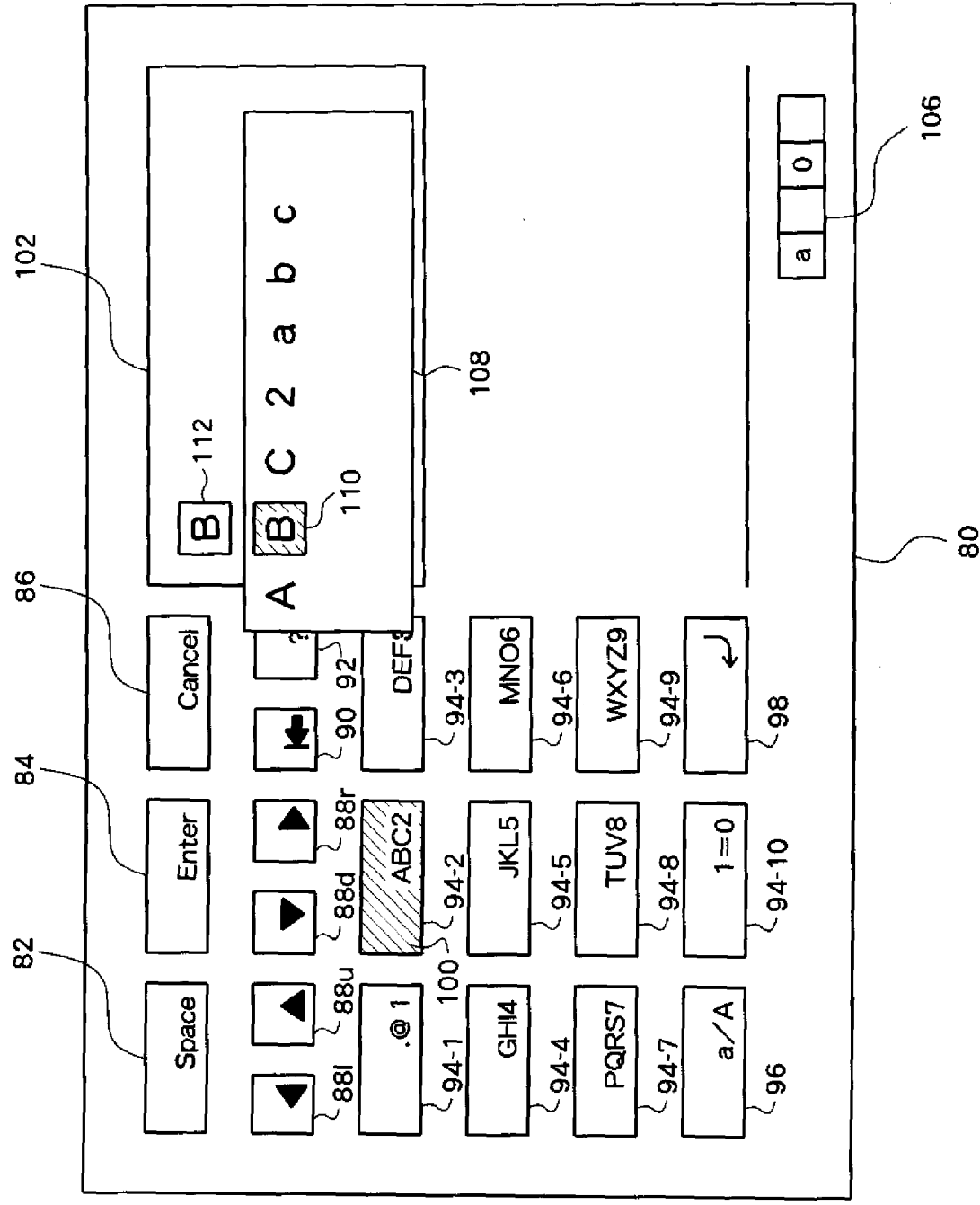
FIG. 9 is a diagram showing another example of the character input screen in the alphabet input mode.

It should be noted that the position at which to display the input candidate presentation image 108 may be determined based on the "the addition position of the character to be next input" (the position of the cursor 104 or the currently selected input candidate 112) within the input state presentation form 102. For example, as shown in FIG. 9, the input candidate presentation image 108 may be displayed such that the input candidate focus 110 in the input candidate presentation image 108 is located in a predetermined position below the currently selected input candidate 112. In this case, when the user presses the selection operation button and the input candidate focus 110 accordingly moves to the next character "C", the input candidate presentation image 108 may slide leftward so that the input candidate focus 110 remains in the predetermined position below the currently selected input candidate 112.

Figure 10:
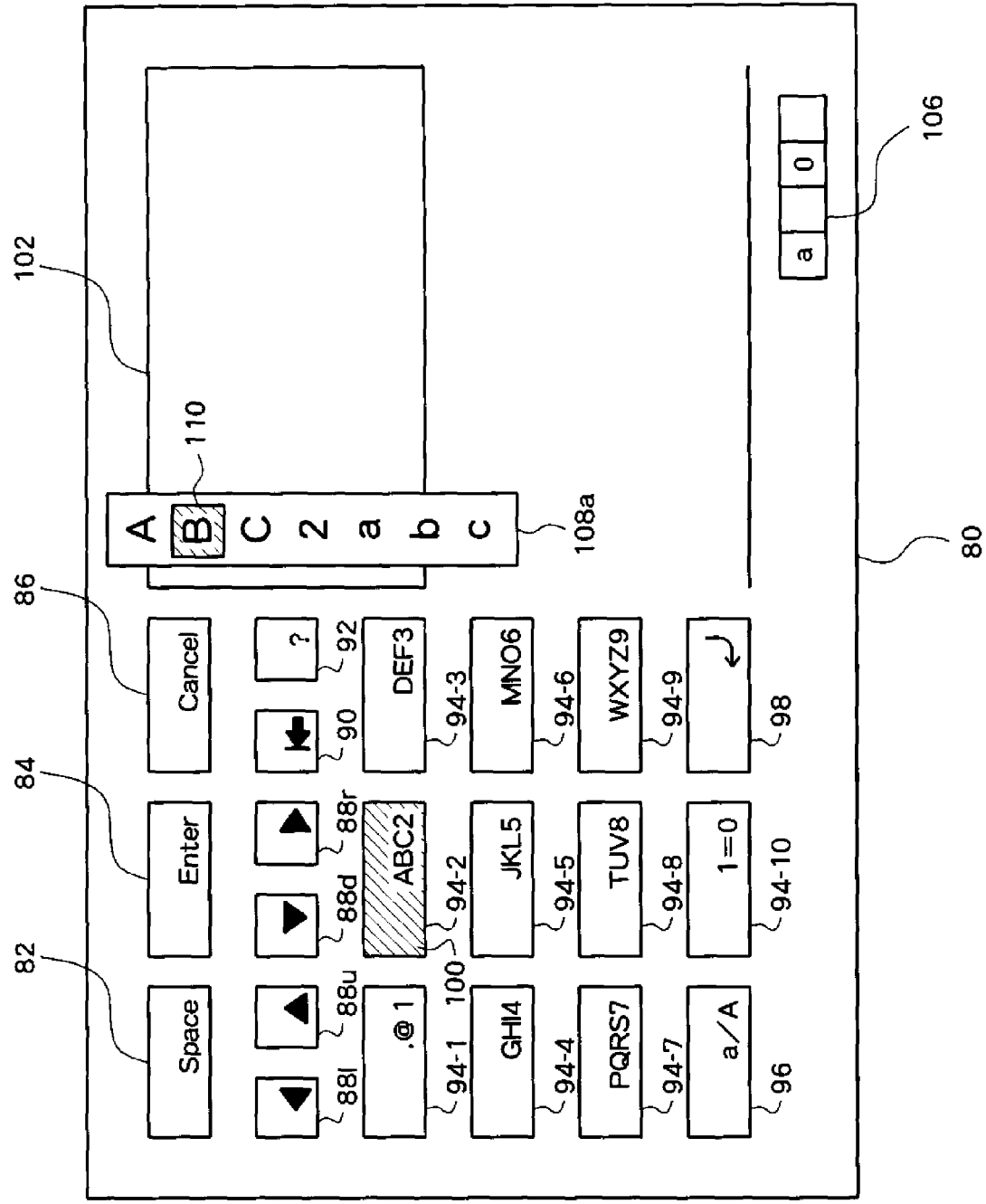
FIG. 10 is a diagram showing still another example of the character input screen in the alphabet input mode.

Alternatively, as shown in FIG. 10, for example, the input candidate presentation image 108a may appear instead of the currently selected input candidate 112. Still alternatively, the position in which to display the input candidate presentation image 108 may be determined based on the position of the character key image distinctively displayed by the key focus 100. For example, as shown in FIG. 11, the input candidate presentation image 108 may be displayed in a predetermined position below the character key image distinctively displayed by the key focus 100.

Figure 11:
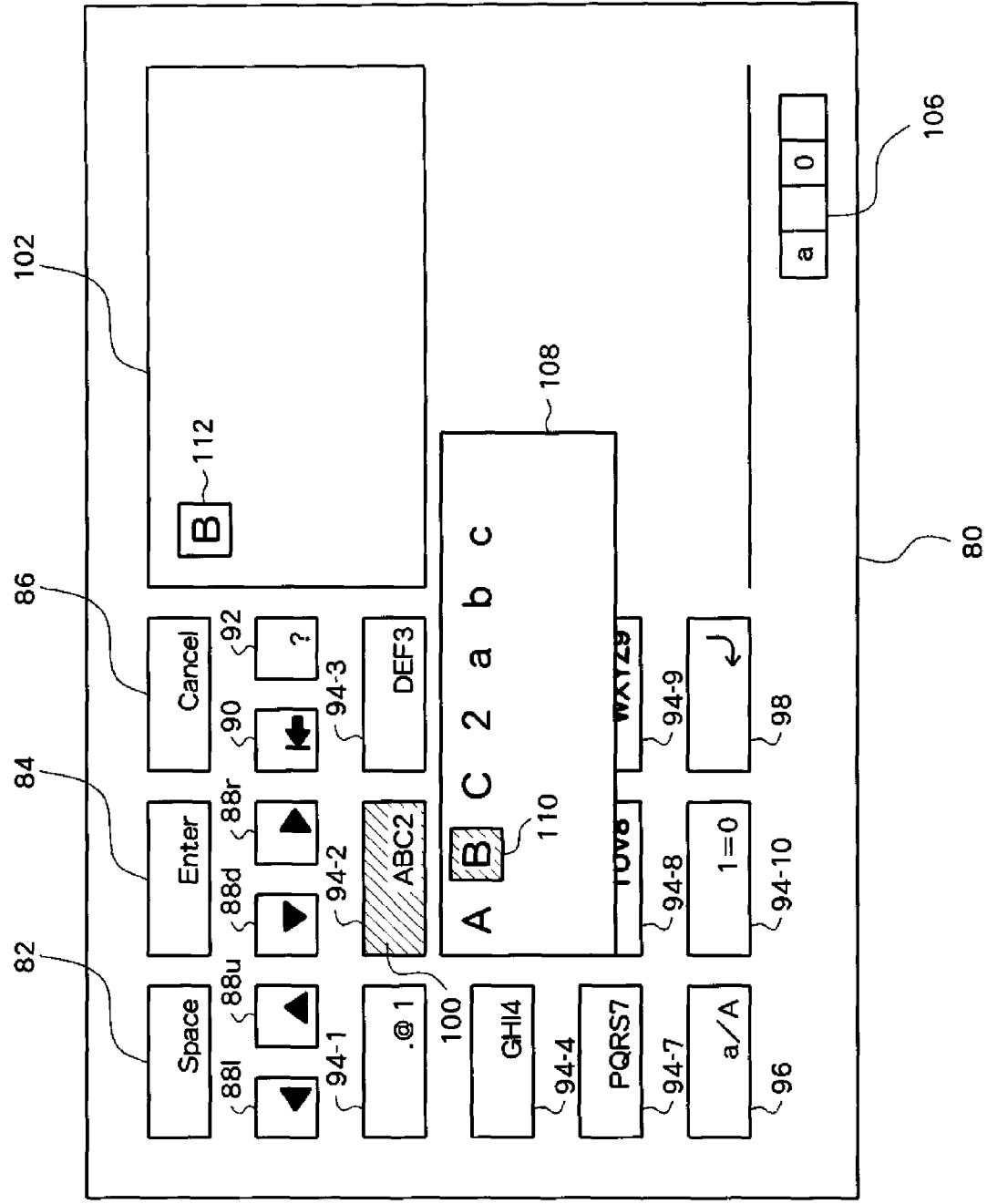
FIG. 11 is a diagram showing yet another example of a character input screen in the alphabet input mode.

As the character input screen 80 designed like any of those which are shown in FIG. 9 through FIG. 11, for example, can narrow down the area to which the user needs to pay attention in the character input operation, the user can comfortably input the character.

An input prediction function is available for the character input screen 80 according to this embodiment. That is, when the user carries out a predetermined operation and the input prediction function is thereby set effective, a character string which the user is going to input is predicted, and one or more predicted character strings are presented. Use of the input prediction function allows the user to promptly input their desired character string.

In this embodiment, predicted character string data such as is shown in FIG. 12, for example, is stored in the storage unit 60. In the predicted character string data, character strings having been input by the user in the past, for example, are stored. According to the input prediction function, one or more predicted character strings contained in the predicted character string data are obtained based on the state of progress of the character input operation by the user, and presented. More specifically, one or more predicted character strings are obtained from the predicted character string data based on the character string having been input (an input character string) and the characters corresponding to the character key image distinctively displayed by the key focus 100, and presented.

For example, when the user inputs the first character (that is, the length of the input character string is 0), "one or more predicted character strings having the top character which is any of the characters corresponding to the character key image distinctively displayed by the key focus 100" is obtained from the predicted character string data and displayed in the input candidate presentation image 108 together with the characters corresponding to the character key image. For example, suppose that the predicted character string data shown in FIG. 12 is stored. When the character key image 94-4 is distinctively displayed, the predicted character strings "good", "http://xxx1.xx.xx", "http://xxx2.xx.xx", "HTTP (HyperText Transfer Protocol)", "httpd", and "imagination" are displayed in the input candidate presentation image 108 together with the characters corresponding to the character key image 94-4, namely, "G", "H", "I", "4", "g", "h", and "i".

In the above, the predicted character strings having the top character which is a character (for example, Chinese character, hiragana, katakana, or the like) other than the object of the alphabet input mode may be displayed in the input candidate presentation image 108. For example, the characters (the characters belonging to the character group "H4") corresponding to the character key image (the character key image 94-4a) shown in the position in the character input screen in the Chinese character hiragana input mode (see FIG. 13), the position being the same as the position of the character key image 94-4 in the alphabet input mode, and one or more prediction character strings (the predicted character string of the prediction character string ID "S18") having that character as the top character may be displayed in the input candidate presentation image 108.

Alternatively, for example, suppose that one or more characters have been already input by the user. In this case, when the addition position of the character to be next input is at the end of the input character string, one or more predicted character strings having a prefix portion matching the "character string formed by connecting any of the characters corresponding to the character key image distinctively displayed by the key focus 100 to the end of the input character string" are obtained from the predicted character string data. In the above, the difference between capital and small alphabetic letters is not considered. Then, the one or more predicted character strings are displayed in the input candidate presentation image 108 together with the characters corresponding to the character key image distinctively displayed by the key focus 100.

For example, in the case where the predicted character string data shown in FIG. 12 is stored, and the character input screen 80 such as is shown in FIG. 6 is shown, the predicted character strings "http://xxx1.xx.xx", "http://xxx2.xx.xx", and "HTTP (HyperText Transfer Protocol)" are displayed in the input candidate presentation image 108 together with the characters corresponding to the character key image 94-1.

In the above, the predicted character string is displayed in the input candidate presentation image 108 such that the portion thereof corresponding to the input character string and the remaining portion thereof are displayed in a discriminated manner. Specifically, the portion corresponding to the input character string and the other portion are discriminated using a bracket ("[" and "]") For example, the predicted character string http://xxx1.xx.xx is presented as http[://xxx1.xx.xx]"; the predicted character string "HTTP (HyperText Transfer Protocol)" is presented as "HTTP[(HyperText Transfer Protocol)]".

Alternatively, for example, the portion corresponding to the input character string and the other portion may be displayed in different colors. As another alternative, for example, the background of the portion corresponding to the input character string and that of the other portion may be displayed in different colors. As a still further alternative, for example, the portion other than the portion corresponding to the input character string may be displayed underlined. As a yet further alternative, for example, the above-described manners of display may be used in a combined manner. As a further alternative, only the portion other than the portion corresponding to the input character string may be displayed in the input candidate presentation image 108.

Meanwhile, when the addition position of the character to be next displayed is not at the end of the input character string, the portion preceding the addition position of the input character string may be regarded as the input character string, and one or more predicted character string may be obtained and presented accordingly. Alternatively, one or more predicted character strings having a prefix portion matching the "character string formed by adding any of the characters corresponding to the character key image distinctively displayed by the key focus 100 to the addition position of the input character string" may be obtained from the predicted character string data and presented.

The predicted character string to be displayed in the input candidate presentation image 108 is available for the user's selection as equivalent to the character displayed in the input candidate presentation image 108 (the characters corresponding to the character key image distinctively displayed by the key focus 100). That is, the input candidate focus 110 moves to the predicted character string shown in the input candidate presentation image 108 in response to the selection operation button pressed by the user, whereby that predicted character string is brought into the selected state. Then, when the user wishing to input the next character, for example, carries out a predetermined operation with the predicted character string remaining in the selected state, the predicted character string is thereby determined as an input character string and displayed as the input character string 103 in the input state presentation frame 102. For example, when the input character string is "http" and the predicted character string "HTTP (HyperText Transfer Protocol)" is determined as an input character string, "HTTP (HyperText Transfer Protocol)" is displayed as the input character string 103 in the input state presentation frame 102. It should be noted that, alternatively, the portion of the predicted character string other than the portion corresponding to the input character string may be additionally displayed in the input state presentation frame 102. For example, in this case, "http (HyperText Transfer Protocol)" may be displayed as the input character string 103 in the input state presentation frame 102.

As described above, a predicted character string is displayed for presentation when the key focus 100 is moved to a character key image, together with the characters corresponding to that character key image. Alternatively, a predicted character string may be displayed for presentation only when so instructed by the user. For example, pressing the predetermined button (for example, the button 16*c*) by the user may trigger the presentation display.

[Chinese Character Hiragana Input Mode]

In the following, the Chinese character hiragana input mode will be described. The Chinese character hiragana input mode is realized similarly to the above described alphabet input mode.

Figure 13:
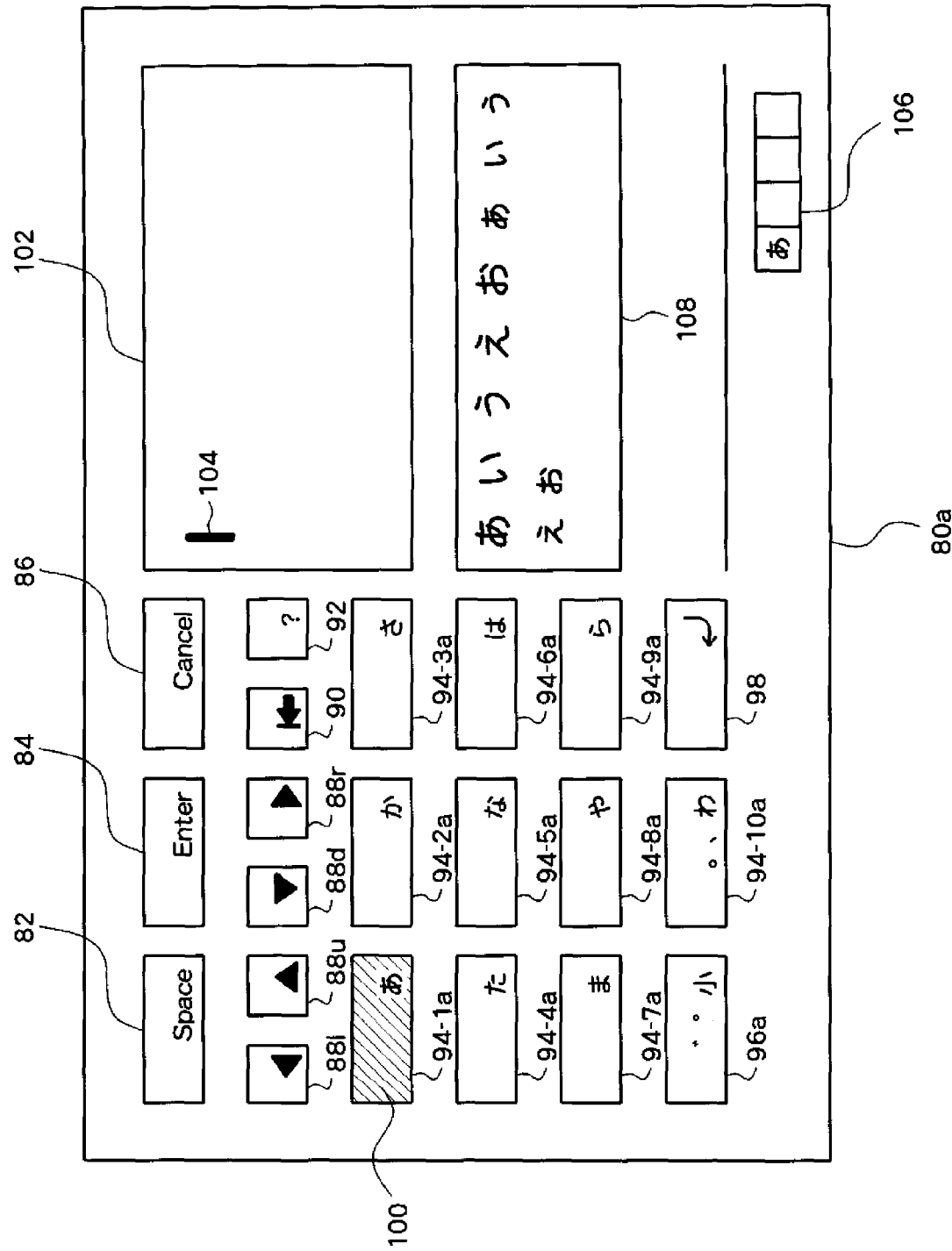
FIG. 13 is a diagram showing one example of the character input screen in the Chinese character hiragana input mode.

FIG. 13 shows a character input screen for the Chinese character hiragana input mode. As shown in FIG. 13, the character input screen 80*a* in this mode differs from the character input screen 80 in the alphabet input mode in that the character key images 94-1*a* through 94-10*a* to which hiragana characters correspond are provided instead of the character key images 94-1 through 94-10, and a voiced sound symbol key image 96*a* is provided instead of the capital-small conversion key image 96. Hiragana characters are grouped as shown in FIG. 4, for example. Also, the portable electronic device 10 in this embodiment holds key image information such as is shown in FIG. 14. The key image information is information similar to the key image information shown in FIG. 5, in which the kinds of key images to be shown on the character input screen 80*a* in the Chinese character hiragana input mode and the positions at which the key images are shown are stored. Further, a character group ID is set corresponding to each of the character key images without duplication.

On the character input screen 80*a* in the Chinese character hiragana input mode, when the key focus 100 is located on any of the character key images, an input candidate presentation image 108 showing the characters corresponding to that character key image is displayed. For example, as shown in FIG. 13, when the key focus 100 is located on the character key image 94-1*a*, the input candidate presentation image 108 presenting the characters corresponding to the character key image 94-1*a* is displayed. It should be noted that the voiced sound symbol key image 96*a* is used to instruct addition of a voiced sound symbol, a semi-voiced sound symbol, and so forth.

In the Chinese character hiragana input mode, a list (not shown) of the Chinese characters into which the input hiragana character can be converted is shown on the character input screen 80*a* in response to the user's predetermined operation (for example, pressing the button 16*d*), and in response to the user's selection and determination of their desired Chinese character the input hiragana character is converted into the Chinese character.

Also in the Chinese character hiragana input mode, similar to the alphabet input mode, with the input prediction function set effective, one or more predicted character strings contained in the predicted character string data are obtained based on the state of progress of the character input operation carried out by the user, and presented. That is, similar to the alphabet input mode, one or more predicted character strings are obtained from the predicted character string data based on the input character string and the characters corresponding to the character key image distinctively displayed by the key focus 100.

For example, when the user inputs the first character, "one or more predicted character strings having the top character which is any of the characters corresponding to the character key image distinctively displayed by the key focus 100" are obtained from the predicted character string data and displayed in the input candidate presentation image 108 together with the characters corresponding to the character key image. For example, suppose that the predicted character string data as shown in FIG. 12 is stored. In this case, when the character key image 94-1*a* is distinctively displayed, the predicted character strings of the predicted character string ID's "S15" and "S17" are displayed in the input candidate presentation image 108 together with the characters corresponding to the character key image 94-1*a* (that is, the characters belonging to the character group "H1").

Alternatively, for example, suppose that one or more characters have already been input by the user. In this case, when the addition position of the character to be next input is at the end of the input character string, one or more predicted character strings having a prefix portion matching "the character string formed by connecting any of the characters corresponding to the character key image distinctively displayed by the key focus 100 to the end of the input character string" are obtained from the predicted character string data. Then, the one or more predicted character strings are displayed in the input candidate presentation image 108 together with the characters corresponding to the focused character key image. For example, suppose that the predicted character string data shown in FIG. 12 is stored. In this case, when the character string shown in FIG. 16 has already been input by the user and the key focus 100 is located on the character key image 94-6*a*, the predicted character string of the predicted character string ID "S12" is displayed in the input candidate presentation image 108 together with the characters corresponding to the character key image 94-6*a* (that is, the characters belonging to the character group "H6").

[Other Aspects of Input Prediction Function]

Here, other aspects of the input prediction function will be described.

It should be noted that one or more predicted character strings may be obtained from the predicted character string data based only on the input character string. For example, one or more predicted character strings having a prefix portion matching the input character string may be obtained from the predicted character string data and displayed in the input candidate presentation image 108. For example, suppose that the input character string is "http". In this case, predicted character strings having a prefix portion matching the input character string "http", such as, "http://xxx1.xx.xx", "http://xxx2.xx.xx", "HTTP (HyperText Transfer Protocol)", and "httpd", are obtained from the predicted character string data (FIG. 12) and displayed in the input candidate presentation image 108.

Alternatively, for example, when the character string shown in FIG. 16 has already been input by the user, the predicted character strings of the predicted character string ID's "S9", "S11", "S12", and "S14" are obtained from the predicted character string data (FIG. 12) and displayed in the input candidate presentation image 108.

According to this aspect, the predicted character string may be displayed for presentation only when so instructed by the user. For example, the presentation display may be carried out in response to a predetermined button (for example, the button 16*c*) being pressed by the user. Alternatively, for example, a prediction key image may be provided on the character input screen 80, 80*a* for instructing display of a predicted character string for presentation, so that the presentation display may be carried out when the user moves the key focus 100 onto the prediction key image and presses the selection operation button. In the above, all of the predicted character strings stored in the predicted character data may be displayed for presentation when the user inputs the first character.

Also, in the predicted character string data (FIG. 12), at least one character group ID may be set corresponding to each of the predicted character strings. Then, one or more predicted character strings corresponding to the character group ID relevant to the character key image distinctively displayed by the key focus 100 are obtained from the predicted character string data and displayed in the input candidate presentation image 108. For example, suppose that the character group ID "H1" is set corresponding to the predicted character string of the predicted character string ID "S9" in the predicted character string data. In this case, when the character key image 94-1a (the character key image set corresponding to the character group ID "H1") is distinctively displayed, the predicted character string of the predicted character string ID "S9" is displayed in the input candidate presentation image 108. With this arrangement, in the Chinese character hiragana input mode, one or more predicted character strings can be displayed for presentation in consideration of the process in which the character input by the user is converted into a Chinese character.

Also, furigana (hiragana) may be set corresponding to each of the predicted character strings in the predicted character string data (FIG. 12). Then, when the user inputs the first character, for example, in the Chinese character hiragana input mode, one or more furigana set having the top character which is any of the characters set corresponding to the character key image distinctively displayed by the key focus 100 are obtained, and one or more predicted character strings set corresponding to those furigana are obtained and displayed in the input candidate presentation image 108.

Alternatively, when one or more hiragana characters have already been input by the user and the addition position of the character to be next input is at the end of the input character string, one or more furigana set which have a prefix portion matching the "character string formed by connecting any of the characters corresponding to the character key image distinctively displayed by the key focus 100 to the end of the input character string" are obtained, and one or more predicted character strings corresponding to those furigana may be obtained, and displayed in the input candidate presentation image 108.

Figure 18:
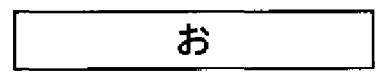
FIG. 18 is a diagram showing one example of a hiragana character.
Figure 19:
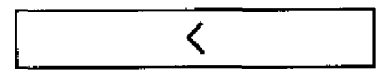
FIG. 19 is a diagram showing one example of a hiragana character.

In this case, suppose that, for example, the furigana shown in FIG. 17 is set corresponding to the predicted character string of the predicted character string ID "S9". In this case, when the user is going to input the first character and the character key image 94-1a (the character key image set corresponding to the character shown in FIG. 18) is distinctively displayed, or when the user having input the character shown in FIG. 18 as the first character is going to input the second character and the character key image 94-2a (the character key image set corresponding to the character shown in FIG. 19) is distinctively displayed, or the like, the predicted character string of the predicted character string ID "S9" is displayed in the input candidate presentation image 108.

Also with the above-described arrangement, in the Chinese character hiragana input mode, one or more predicted character strings can be presented in consideration of the process in which the character input by the user is converted into a Chinese character. It should be noted that, according to this aspect, the predicted character string may be presented only when the user inputs the first character. In this case, only the top character of each furigana may be set corresponding to each of the predicted character strings in the predicted character string data (FIG. 12).

When the user inputs the first character in the Chinese character hiragana mode, one or more Chinese characters into which the characters corresponding to the character key image distinctively displayed by the key focus 100 can be converted are obtained, and one or more predicted character strings having any of those Chinese characters as the top character may be displayed in the input candidate presentation image 108.

When the user inputs the second and thereafter characters to be added to the end of the input character string, one or more Chinese characters to which the input character or characters can be converted based on the characters corresponding to the character key image distinctively displayed by the key focus 100 are obtained, and one or more predicted character strings having a prefix portion matching the "character string formed by connecting any of the obtained Chinese characters to the end of the input character string" may be displayed in the input candidate presentation image 108.

Figure 20:
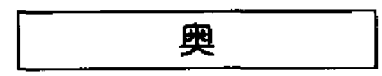
FIG. 20 is a diagram showing one example of a Chinese character.

According to this aspect, for example, data in which each of the Chinese characters is set corresponding to at least the top character (hiragana) of the yomigana thereof may be stored in the storage unit 60. For example, suppose that the Chinese character shown in FIG. 20 is set corresponding to the character (hiragana) shown in FIG. 18 in the data. In this case, when the user is going to input the first character and the character key image 94-1a (the character key image corresponding to the character shown in FIG. 18) is distinctively displayed, one or more Chinese characters (for example, the Chinese character shown in FIG. 20) corresponding to any of the characters relevant to the character key image 94-1a (for example, the character shown in FIG. 18) are obtained and one or more predicted character strings having any of those Chinese characters as the top character (for example, the predicted character string of the predicted character string ID "S9") are obtained from the predicted character string data and displayed in the input candidate presentation image 108.

Also with the above-described arrangement, in the Chinese character hiragana input mode, one or more predicted character strings can be presented in consideration of the process in which the character input by the user is converted into a Chinese character.

Alternatively, for example, meta information, such as "a historical person", "historical literature", "a noun constituted of Chinese characters", and so forth, may be set corresponding to each of the predicted character strings in the predicted character string data (FIG. 12). Then, the user utilizing the input prediction function is guided by being encouraged to designate meta information, so that one or more predicted character strings corresponding to the meta information designated by the user are displayed in the input candidate presentation image 108. For example, suppose that meta information "a historical person" is set corresponding to the predicted character strings of the predicted character string ID's "S10" and "S13". In this case, when the user designates the meta information "historical person", those predicted character strings are displayed in the input candidate presentation image 108.

It should be noted that the portable electronic device 10 can be arranged comprising the input prediction functions according to all of the above described aspects. Moreover, it may be arranged such that whether or not to set the input prediction function effective can be designated through the user's predetermined operation, and that, when setting the input prediction function effective, the input prediction function according to which of the above-described aspects is employed can be set.

In the following, a function realized by the portable electronic device 10 will be described.

FIG. 15 is a diagram showing mainly the functions relevant to the present invention, among those realized by the portable electronic device 10. As shown in FIG. 15, the portable electronic device 10 comprises a character storage unit 120, a key image information storage unit 122, a focused character group specification information storage unit 124, a currently selected input candidate specification information storage unit 126, an input character storage unit 128, a predicted character string storage unit 130, a predicted character string acquisition unit 132, a focused character group specification information update unit 134, a currently selected input candidate specification information update unit 136, an input character determination unit 138, and a display control unit 140. These functions are realized by the control unit 50 by carrying out a program stored in the storage unit 60.

[Character Storage Unit]

The character storage unit 120 is realized using the storage unit 60 as a main element. The character storage unit 120 stores a plurality of characters such that each of the characters corresponds to at least one of the plurality of character groups. The character storage unit 120 stores the character group information such as is shown in FIG. 4, for example.

[Key Image Information Storage Unit]

The key image information storage unit 122 is realized using the storage unit 60 as a main element. The key image information storage unit 122 stores key image information in each input mode, such as is shown in FIG. 5 or 14, for example.

[Focused Character Group Specification Information Storage Unit]

The focused character group specification information storage unit 124 is realized using the storage unit 60 as a main element. The focused character group specification information storage unit 124 stores the key image ID of the key image which is distinctively displayed by the key focus 100 among the key images shown on the character input screen 80, 80a. For example, in the case where the key focus 100 is located on the character key image 94-1 in the alphabet input mode, the key image ID "001" of the character key image 94-1 is stored in the focused character group specification information storage unit 124.

In this embodiment, as the key image ID and the character group ID of a character key image are set corresponding to each other in the key image information stored in the key image information storage unit 122, the key image ID stored in the focused character group specification information storage unit 124 serves as information (focused character group specification information) for specifying a character group (a focused character group) corresponding to the key image distinctively displayed by the key focus 100.

[Currently Selected Input Candidate Specification Information Storage Unit]

The currently selected input candidate specification information storage unit 126 is realized using the storage unit 60 as a main element. The currently selected input candidate specification information storage unit 126 stores information (a currently selected input candidate specification information) for specifying a character or a predicted character string (a currently selected input candidate) distinctively displayed by the input candidate focus 110 among the characters stored corresponding to the character group ID corresponding to the key image ID stored in the focused character group specification information storage unit 124 and at least one predicted character string obtained by the predicted character string acquisition unit 132, to be described later.

In this embodiment, the currently selected input candidate specification information storage unit 126 stores the character or the predicted character string itself distinctively displayed by the input candidate focus 110. That is, the currently selected input candidate specification information storage unit 126 stores the character or the predicted character string in the selected state in the input candidate presentation image 108.

It should be noted that the key image ID stored in the focused character group specification information storage unit 124 at the time when a character or a predicted character string is written into the currently selected input candidate specification information storage unit 126, is additionally stored in the currently selected input candidate specification information storage unit 126. That is, the key image ID of the key image which is distinctively displayed by the key focus 100 at the time when a character or a predicted character string is brought into the selected state is stored in the currently selected input candidate specification information storage unit 126.

[Input Character Storage Unit]

The input character storage unit 128 is realized using the storage unit 60 as a main element. The input character storage unit 128 stores the character determined as an input character by the input character determination unit 138 to be described later. That is, the input character storage unit 128 stores the character string which is displayed as the input character string 103 in the input state presentation form 102.

It should be noted that the information (addition position information) on the position of the input character string, at which to add the character to be next input, is stored in the input character storage unit 128. The addition position information is updated when the selection operation button is pressed when the key focus 100 is located on the direction key image 88l, 88u, 88d, or 88r or when an input character is determined by the input character determination unit 138 to be described later.

[Predicted Character String Storage Unit]

The predicted character string storage unit 130 is realized using the storage unit 60 as a main element. The predicted character string storage unit 130 stores a plurality of predicted character strings. In this embodiment, the predicted character string storage unit 130 stores the predicted character string data such as is shown in FIG. 12, for example.

[Focused Character Group Specification Information Update Unit]

The focused character group specification information update unit 134 is realized using the control unit 50 as a main element. The focused character group specification information update unit 134 determines for every predetermined period of time (1/60 second in this embodiment) whether or not an operation (a focused point moving operation) to move the key focus 100 has been carried out, based on the operation data output from the operation unit 54. That is, the focused character group specification information update unit 134 determines whether or not operation data describing the operation carried out with respect to the direction keys 18u, 18d, 18l, and 18r is output from the operation unit 54, and also obtains the content of the operation carried out with respect to the direction keys 18u, 18d, 18l, and 18r (the direction designated by the direction keys 18u, 18d, 18l, and 18r).

Then, when it is determined that the direction keys 18u, 18d, 18l, and 18r have been operated, the focused character group specification information update unit 134 specifies the key image to which the key focus 100 is going to move. The key image to which the key image is going to move is specified based on, for example, the key image ID stored in the focused character group specification information storage unit 124 (that is, the key image ID of the key image where the key focus 100 is currently located), the content of the operation carried out with respect to the direction keys 18*u*, 18*d*, 18*l*, and 18*r*, and the key image information (display position information of each key image) stored in the key image information storage unit 122. Having specified the key image to which the key focus 100 is going to move, the focused character group specification information update unit 134 updates the content stored in the focused character group specification information storage unit 124 such that the key image ID stored in the focused character group specification information storage unit 124 is updated to the key image ID of the key image to which the key focus 100 is going to move.

[Predicted Character String Acquisition Unit]

The predicted character string acquisition unit 132 is realized using the control unit 50 as a main element. The predicted character string acquisition unit 132 obtains at least one of the predicted character strings stored in the predicted character string storage unit 130 based on the content stored in the input character storage unit 128 and the characters stored corresponding to the character group specified by the key image ID stored in the focused character group specification information storage unit 124.

[Currently Selected Input Candidate Specification Information Update Unit]

The currently selected input candidate specification information update unit 136 is realized using the control unit 50 as a main element. When the key image relevant to the key image ID stored in the focused character group specification information storage unit 124 is a character key image, the currently selected input candidate specification information update unit 136 determines for every predetermined period of time (1/60 second in this embodiment) whether or not the selection operation button has been pressed (an input character selection operation), based on the operation data output from the operation unit 54. Then, when it is determined that the selection operation button has been pressed, the currently selected input candidate specification information update unit 136 updates the content stored in the currently selected input candidate specification information storage unit 126 such that the character or the predicted character string held in the currently selected input candidate specification information storage unit 126 is updated to the character or the predicted character string immediately after that character or predicted character string among the characters stored corresponding to the character group specified by the key image ID stored in the focused character group specification information storage unit 124 and the at least one predicted character string obtained by the predicted character string acquisition unit 132.

Also, when the character or the predicted character string stored in the currently selected input candidate specification information storage unit 126 is updated, the currently selected input candidate specification information update unit 136 updates the key image ID stored in the currently selected input candidate specification information storage unit 126 into the key image ID stored at that time in the focused character group specification information storage unit 124.

[Input Character Determination Unit]

The input character determination unit 138 is realized using the control unit 50 as a main element. When any of the characters or predicted character strings is in the selected state, the input character determination unit 138 determines for every predetermined period of time (1/60 second in this embodiment) whether or not the key focus 100 has been moved to another key image and the selection operation button has been pressed. Specifically, when a character or a predicted character string is held in the currently selected input candidate specification information storage unit 126, the input character determination unit 138 determines whether or not the selection operation button has been pressed (an input character determination operation), based on the operation data output from the operation unit 54. Then, when it is determined that the selection operation button has been pressed, the input character determination unit 138 then determines whether or not the key image ID stored in the focused character group specification information storage unit 124 is different from the key image ID stored in the currently selected input candidate specification information storage unit 126.

As described above, the key image ID stored in the focused character group specification information storage unit 124 indicates the key image ID of the key image currently distinctively displayed; the key image ID stored in the currently selected input candidate specification information storage unit 126 indicates the image ID of the key image distinctively displayed at the time when the character or the predicted character string held in the currently selected input candidate specification information storage unit 126 is brought into the selected state. Therefore, in the case where these key image ID's are different from each other, it is determined that the selection operation button is pressed after the key focus 100 has moved to another key image.

When it is determined that these key image ID's are different, the input character determination unit 138 determines the character or the predicted character string held in the currently selected input candidate specification information storage unit 126 as an input character (an input character string). That is, the input character determination unit 138 determines the character or the predicted character string distinctively displayed in the input candidate presentation image 108 (the character or the predicted character string in the selected state) as an input character (an input character string).

For example, when a character is held in the currently selected input candidate specification information storage unit 126, the input character determination unit 138 obtains the input character string and the addition position information from the input character storage unit 128, and holds a "character string formed by adding the character held in the currently selected input candidate specification information storage unit 126 to the position indicated by the addition position information, of the input character string" as an input character string in the input character storage unit 128.

Meanwhile, for example, when a predicted character string is held in the currently selected input candidate specification information storage unit 126, the input character determination unit 138 causes the input character storage unit 128 to store the predicted character string as an input character string instead of the input character string currently held in the input character storage unit 128. Alternatively, the input character determination unit 138 obtains the input character string from the input character storage unit 128, and causes the input character storage unit 128 to store a "character string formed by adding a partial predicted character string resulted by excluding the input character string from the predicted character string held in the currently selected input candidate specification information storage unit 126 to the input character string" as an input character string.

It should be noted that, having determined an input character (an input character string), the input character determination unit 138 initializes the content stored in the currently selected input candidate specification information storage unit 126 to thereby ensure that no character, no predicted character string, and no key image ID is stored in the currently selected input candidate specification information storage unit 126. Further, the input character determination unit 138 updates the addition position information stored in the input character storage unit 128.

[Display Control Unit]

The display control unit 140 is realized using the control unit 50 and the image processing unit 64 as main elements. The display control unit 140 produces a character input screen such as is shown in FIGS. 3, 6 through 11, and 13, for example, for every predetermined period of time (1/60 second in this embodiment) based on the content stored in the character storage unit 120, the key image information storage unit 122, the focused character group specification information storage unit 124, the currently selected input candidate specification information storage unit 126, and the input character storage unit 128, and at least one predicted character string obtained by the predicted character string acquisition unit 132, and displays in the liquid crystal display 12.

Initially, the display control unit 140 renders into the VRAM the image of a character input screen in which the respective key images, the input state presentation form 102, and the input mode indication image 106 are arranged at the respective positions, based on the key image information stored in the key image information storage unit 122. In this case, when the character having been input by the user (an input character string) is stored in the input character storage unit 128, the display control unit 140 displays the input character string in the input state presentation form 102.

Further, when neither a character nor a predetermined character string is held in the currently selected input candidate specification information storage unit 126, the display control unit 140 displays the cursor 104 in the input state presentation form 102 based on the addition position information stored in the input character storage unit 128.

When a character is held in the currently selected input candidate specification information storage unit 126, the display control unit 140 displays the currently selected input candidate 112 indicating the character in the input state presentation form 102 based on the addition position information stored in the input character storage unit 128. Meanwhile, when a predicted character string is held in the currently selected input candidate specification information storage unit 126, the display control unit 140 displays the currently selected input candidate 112 indicating the portion of the predicted character string, other than the input character string in the input state presentation form 102, based on the addition position information stored in the input character storage unit 128.

Thereafter, the display control unit 140 obtains the key image ID stored in the focused character group specification information storage unit 124. Then, a position in the image of the character image screen, rendered in the VRAM, at which to display the key image relevant to the key image ID is specified based on the key image information stored in the key image information storage unit 122, and a predetermined image (a key focus image) is placed at the display position for combination in a semitransparent manner. As described above, the display control unit 140 forms the key focus 100 on the key image relevant to the key image ID stored in the focused character group specification information storage unit 124.

It should be noted that in order to distinctively display the key image relevant to the key image ID stored in the focused character group specification information storage unit 124, the display control unit 140 may display the key image in a different manner (color, brightness, or the like) and/or using a different shape from those for the other key images.

Also, when the key image relevant to the key image ID stored in the focused character group specification information storage unit 124 is a character key image, the display control unit 140 obtains the character group ID corresponding to that key image ID from the key image information stored in the key image information storage unit 122. Thereafter, the display control unit 140 obtains the characters corresponding to the character group ID based on the character group information stored in the character storage unit 120, and further causes the predicted character string acquisition unit 132 to obtain one or more predicted character strings. Then, the display control unit 140 produces the input candidate presentation image 108 based on the obtained characters and at least one predicted character string obtained by the predicted character string acquisition unit 132, and draws to overwrite the resultant image at a predetermined position in the image of the character input screen, rendered in the VRAM.

Alternatively, it should be noted that the display control unit 140 may obtain the position at which to display the key image relevant to the key image ID stored in the focused character group specification information storage unit 124, based on the key image information stored in the key image information storage unit 122, and draw for combination the input candidate presentation image 108 at the position determined based on the obtained display position (see FIG. 11). Further, the display control unit 140 obtains the position at which to display the character to be next input in the input state presentation form 102 based on the content stored in the input character storage unit 128, and draws for combination the input candidate presentation image 108 at the position determined based on the obtained position (see FIGS. 9 and 10).

When a character or a predicted character string is held in the currently selected input candidate specification information storage unit 126, the display control unit 140 specifies a position at which to display the input candidate presentation image 108 corresponding to the character or the predicted character string, and places a predetermined image (an input candidate focus image) at the display position for combination in a semitransparent manner. That is, the display control unit 140 forms the input candidate focus 110 on the character or the predicted character string shown in the input candidate presentation image 108, which is identical to the character or the predicted character string held in the currently selected input candidate specification information storage unit 126. It should be noted that in order to distinctively display the character or the predicted character string shown in the input candidate presentation image 108, which is identical to the character or predicted character string held in the currently selected input candidate specification information storage unit 126, the display control unit 140 may display the character or the predicted character string in a different manner (color and/or brightness).

As described above, the image of the character input screen, rendered in the VRAM is output to the liquid crystal display 12 at a predetermined timing.

As described above, the portable electronic device 10 according to this embodiment is designed such that a character is input by the user by moving the key focus 100 onto a character key image, and selecting and determining an input character from among the characters set corresponding to that character key image. For this arrangement, the user about to input a character needs to know which of the character key images displayed on the character input screen is "the character key image set corresponding to their desired character".

Without the knowledge of "the character key image set corresponding to their desired character", the user cannot smoothly input the character.

Regarding this point, in the portable electronic device 10, according to the key focus 100 having been moved by the user to a character key image, the input candidate presentation image 108 showing the characters corresponding to that character key image is displayed. This arrangement helps the user promptly know the character key image to which their desired character corresponds, and can therefore smoothly input the character.

Also, in the portable electronic device 10, as the character in the selected state is distinctively displayed in the input candidate presentation image 108, the user can know at a glance how many more times they needs to press the selection operation button in order to bring their desired character into the selected state. This helps the user smoothly input the character.

It should be noted that the present invention is not limited to the above-described embodiment.

For example, although a case in which the character input device according to an embodiment of the present invention is realized using the portable electronic device 10 is described in the above, the character input device according to an embodiment of the present invention may alternatively be realized using any other computer system, such as a personal computer, a game system comprising a consumer game machine having a monitor of a TV receiver or the like connected thereto, and so forth.

Also, for example, although the alphabet input mode and the Chinese character hiragana input mode for the character input screen 80 are described as examples in the above, a similar arrangement can be made with respect to any other input mode such as a katakana input mode, and so forth, so that the user can smoothly input a character, similar to the alphabet input mode and the Chinese character hiragana input mode.

Also, for example, the portable electronic device 10 may be arranged comprising a character input mode adapted to languages other than the languages described above, such as Cyrillic, Hangul, Thai, traditional Chinese, simplified Chinese, and so forth, so that the user can also smoothly input a relevant character in these input modes, similar to the alphabet input mode and the Chinese character hiragana input mode described above.

The invention claimed is:

1. A character input device for determining an input character from among a plurality of characters, comprising:
   character storage means for storing the plurality of characters such that each character is within at least one of a plurality of character groups and each character group includes more than one of the plurality of characters;
   predicted character string storage means for storing a plurality of predicted character strings;
   focused character group specification information storage means for storing focused character group specification information that indicates a selected state of any of the plurality of character groups as a focused character group;
   predicted character string acquisition means for obtaining one or more predicted character strings that are expected to be input by a user from among the plurality of predicted character strings stored in the predicted character string storage means based on each of the characters in the focused character group;
   currently selected input candidate specification information storage means for storing currently selected input candidate specification information for specifying, as a currently selected input candidate one of: (i) any of the characters of the focused character group, and (ii) any of the one or more predicted character strings obtained by the predicted character string acquisition means;
   display control means for causing display means to display a character input screen containing: (i) character group correspondence images, each corresponding to one of the plurality of character groups, and (ii) an input candidate presentation image for presenting each of the characters in the focused character group and the one or more predicted character strings obtained by the predicted character string acquisition means;
   focused character group specification information update means for updating the focused character group specification information according to a focused point moving operation by the user, such that the character group specified according to the focused character group specification information is updated to any of the plurality of character groups;
   currently selected input candidate specification information update means for updating the currently selected input candidate specification information according to the user pressing a single input character selection button, such that the character or the predicted character string specified according to the currently selected input candidate specification information is updated to any of the characters and the one or more predicted character strings presented in the input candidate presentation image; and
   input character determination means for determining, in a case where a character is specified as the currently selected input candidate according to the currently selected input candidate specification information, the character as the input character according to an input character determination operation by the user, and determining, in a case where a predicted character string is specified as the currently selected input candidate according to the currently selected input candidate specification information, at least some of the characters contained in the predicted character string as the input character according to the input character determination operation.

2. The character input device according to claim 1, wherein the display control means includes means for obtaining a position in the character input screen, of the character group correspondence image corresponding to the character group specified according to the focused character group specification information, and determines a position at which to display the input candidate presentation image based on the obtained position.

3. The character input device according to claim 1, wherein the character input screen contains a display area for displaying the input character determined by the input character determination means, and
   the display control means includes means for obtaining a position within the display area, at which to display the input character when the input character is determined by the input character determination means, and determines a position at which to display the input candidate presentation image based on the obtained position.

4. The character input device according to any one of claims 1 through 3, further comprising:
   input character storage means for storing the input character determined by the input character determination means, wherein the predicted character string acquisition means obtains the one or more predicted character strings corresponding to a combination of: (i) the input character stored in the input character storage means, and (ii) each of the characters of the focused character group.

5. The character input device according to claim 1, wherein character key images corresponding to each of the plurality of character groups are simultaneously displayed.

6. The character input device according to claim 5, further comprising a display that shows an input candidate presentation image in addition to the display of the character key images.

7. The character input device according to claim 1, wherein respective character key images of any of the plurality of character groups selected as a focused character group are highlighted indicating the selected state of character groups.

8. A control method for: (i) controlling a character input device for storing a plurality of characters such that each character is within at least one of a plurality of character groups and each character group includes more than one of the plurality of characters, and (ii) determining an input character from among the plurality of characters, the method comprising:

reading focused character group specification information from a focused character group specification information storage means which stores the focused character group specification information that indicates a selected state of any of the plurality of character groups as a focused character group;

obtaining one or more predicted character strings that are expected to be input by a user from among a plurality of predicted character strings stored in a predicted character string storage means based on each of the characters in the focused character group;

reading currently selected input candidate specification information from a currently selected input candidate specification information storage means, the currently selected input candidate specification information for specifying, as a currently selected input candidate one of: (i) any of the characters of the focused character group, and (ii) any of the one or more predicted character strings obtained in the predicted character string acquisition step;

causing display means to display a character input screen containing: (i) character group correspondence images, each corresponding to one of the plurality of character groups, and (ii) an input candidate presentation image for presenting each of the characters in the focused character group, and the one or more predicted character strings obtained in the predicted character string acquisition step;

updating the focused character group specification information according to a focused point moving operation by the user, such that the character group specified according to the focused character group specification information is updated to any of the plurality of character groups;

updating the currently selected input candidate specification information according to the user pressing a single input character selection button, such that the character or the predicted character string specified according to the currently selected input candidate specification information is updated to any of the characters and the one or more predicted character strings presented in the input candidate presentation image; and determining, in a case where a character is specified as the currently selected input candidate according to the currently selected input candidate specification information, the character as the input character according to an input character determination operation by the user, and determining, in a case where a predicted character string is specified as the currently selected input candidate according to the currently selected input candidate specification information, at least some of the characters contained in the predicted character string as the input character according to the input character determination operation.

9. A non-transitory computer readable information storage medium storing a program for causing a computer to function as a character input device for determining an input character from among a plurality of characters, the program further causing the computer to function as:

character storage means for storing the plurality of characters such that each character is within at least one of a plurality of character groups and each character group includes more than one of the plurality of characters;

predicted character string storage means for storing a plurality of predicted character strings;

focused character group specification information storage means for storing focused character group specification information that indicates a selected state of any of the plurality of character groups as a focused character group;

predicted character string acquisition means for obtaining one or more predicted character strings that are expected to be input by a user from among the plurality of predicted character strings stored in the predicted character string storage means based on each of the characters in the focused character group;

currently selected input candidate specification information storage means for storing currently selected input candidate specification information for specifying, as a currently selected input candidate one of: (i) any of the characters of the focused character group, and (ii) any of the one or more predicted character strings obtained by the predicted character string acquisition means;

display control means for causing display means to display a character input screen containing: (i) character group correspondence images, each corresponding to one of the plurality of character groups, and (ii) an input candidate presentation image for presenting each of the characters in the focused character group and the one or more predicted character strings obtained by the predicted character string acquisition means;

focused character group specification information update means for updating the focused character group specification information according to a focused point moving operation by the user, such that the character group specified according to the focused character group specification information is updated to any of the plurality of character groups;

currently selected input candidate specification information update means for updating the currently selected input candidate specification information according to the user pressing a single input character selection button, such that the character or the predicted character string specified according to the currently selected input candidate specification information is updated to any of the characters and the one or more predicted character strings presented in the input candidate presentation image; and input character determination means for determining, in a case where a character is specified as the currently selected input candidate according to the currently selected input candidate specification information, the character as the input character according to an input character determination operation by the user, and determining, in a case where a predicted character string is specified as the currently selected input candidate according to the currently selected input candidate specification information, at least some of the characters contained in the predicted character string as the input character according to the input character determination operation.

* * * * *